United States Patent
Rahane et al.

(10) Patent No.: US 10,166,527 B2
(45) Date of Patent: Jan. 1, 2019

(54) SURFACE MODIFICATION OF POROUS BASE SUPPORTS

(71) Applicant: MERCK PATENT GMBH, Darmstadt (DE)

(72) Inventors: Santosh Rahane, Acton, MA (US); Nanying Bian, Lexington, MA (US); Daniel Scheid, Bensheim (DE)

(73) Assignee: MERCK PATENT GMBH, Darmstadt (DE)

(*) Notice: Subject to any disclaimer, the term of this patent is extended or adjusted under 35 U.S.C. 154(b) by 597 days.

(21) Appl. No.: 14/440,269

(22) PCT Filed: Oct. 2, 2013

(86) PCT No.: PCT/EP2013/002967
§ 371 (c)(1),
(2) Date: May 1, 2015

(87) PCT Pub. No.: WO2014/067605
PCT Pub. Date: May 8, 2014

(65) Prior Publication Data
US 2015/0298097 A1    Oct. 22, 2015

Related U.S. Application Data

(60) Provisional application No. 61/721,178, filed on Nov. 1, 2012.

(51) Int. Cl.
*B01D 15/00* (2006.01)
*B01J 20/283* (2006.01)
(Continued)

(52) U.S. Cl.
CPC ........ *B01J 20/283* (2013.01); *B01D 15/3809* (2013.01); *B01J 20/286* (2013.01); *B01J 20/289* (2013.01); *B01J 20/3085* (2013.01); *B01J 20/3204* (2013.01); *B01J 20/3219* (2013.01); *B01J 20/3227* (2013.01); *B01J 20/3236* (2013.01); *B01J 20/3278* (2013.01); *C08F 292/00* (2013.01)

(58) Field of Classification Search
None
See application file for complete search history.

(56) References Cited

U.S. PATENT DOCUMENTS

| | | |
|---|---|---|
| 4,108,603 A | 8/1978 | Regnier et al. |
| 4,661,138 A | 4/1987 | Murakami et al. |
| 4,724,207 A | 2/1988 | Hou et al. |

FOREIGN PATENT DOCUMENTS

| | | |
|---|---|---|
| CN | 102335594 A | 2/2012 |
| EP | 0172579 A2 | 2/1986 |
| WO | 9631549 A1 | 10/1996 |

OTHER PUBLICATIONS

Ge et al. Journal of Chromatographic Science, vol. 48, Jan. 2010.*
(Continued)

*Primary Examiner* — Allison G Fitzsimmons
(74) *Attorney, Agent, or Firm* — Millen White Zelano and Branigan, PC; Csaba Henter

(57) ABSTRACT

The present invention relates to new separation materials with improved binding capacity, its manufacturing, and application, especially for binding protein A.

15 Claims, 26 Drawing Sheets

(51) Int. Cl.
    *B01D 15/38*     (2006.01)
    *B01J 20/289*     (2006.01)
    *B01J 20/32*     (2006.01)
    *B01J 20/286*     (2006.01)
    *B01J 20/30*     (2006.01)
    *C08F 292/00*     (2006.01)

(56) References Cited

OTHER PUBLICATIONS

International Search Report for PCT/EP2013/002967 dated Jan. 27, 2014.
English Abstract of WO-9631549, Publication Date: Oct. 10, 1996.
English Abstract of CN-102335594, Publication Date: Feb. 1, 2012.

\* cited by examiner

FG = functional groups

Fig. 17
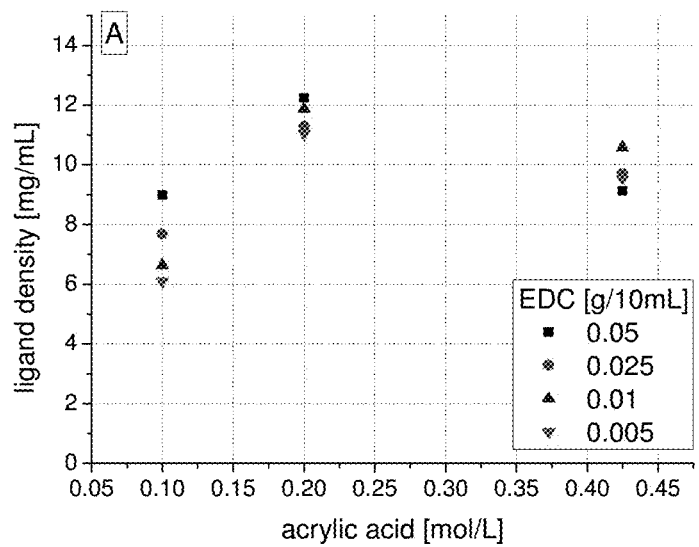
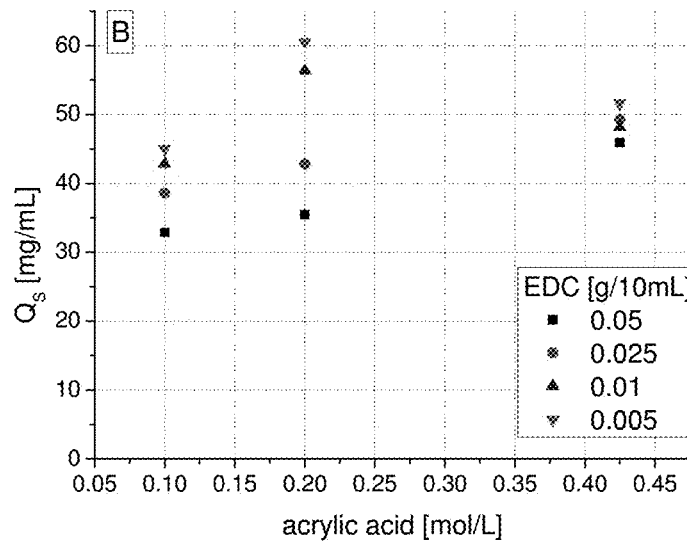

Fig. 25 a) – d)

SURFACE MODIFICATION OF POROUS BASE SUPPORTS

The present invention relates to new separation materials with improved binding capacity, its manufacturing, and use, especially for binding protein A.

BACKGROUND OF THE INVENTION

Protein A and Purification of Monoclonal Antibodies

Since monoclonal antibodies (mAbs) are used for pharmaceutical applications, they are required in exceptionally high purities [A. Jungbauer, G. Carta, in: Protein Chromatography, Process Development and Scale-Up; WILEY-VCH Verlag, Weinheim (Germany) 2010].

Protein A is initially a 56 kDa surface protein originally found in the cell wall of the bacterium *Staphylococcus aureus*. It is encoded by the spa gene and its regulation is controlled by DNA topology, cellular osmolarity, and a two-component system called ArlS-ArlR. It has found use in biochemical research because of its ability to bind immunoglobulins. It is originally composed of five homologous Ig-binding domains that fold into a three-helix bundle. Each domain is able to bind proteins from many mammalian species, most notably IgGs. It binds the heavy chain within the Fc region of most immunoglobulins and also within the Fab region in the case of the human VH3 family. Through these interactions in serum, where IgG molecules are bound in the wrong orientation (in relation to normal antibody function), the bacteria disrupts opsonization and phagocytosis.

Here the terms "Protein A" and "Prot A" are used interchangeably and encompasses Protein A recovered from a native source thereof, Protein A produced synthetically (e.g., by peptide synthesis or by recombinant techniques), and variants thereof which retain the ability to bind proteins which have a $CH_2/CH_3$ region, such as an Fc region. Protein A can be purchased commercially from Repligen, GE or Fermatech. Protein A is generally immobilized on a chromatography matrix. A functional derivative, fragment or variant of Protein A used in the methods and systems according to the present invention may be characterized by a binding constant of at $K=10^8$ M, and preferably $K=10^9$ M, for the Fc region of mouse IgG2a or human IgGI. An interaction compliant with such value for the binding constant is termed "high affinity binding" in the present context. In some embodiments, such functional derivative or variant of Protein A comprises at least part of a functional IgG binding domain of wild-type Protein A, selected from the natural domains E, D, A, B, C or engineered mutants thereof which have retained IgG binding functionality.

Also, Protein A derivatives or variants engineered to allow a single-point attachment to a solid support may also be used in the affinity chromatography step in the claimed methods.

Single point attachment generally means that the protein moiety is attached via a single covalent bond to a chromatographic support material of the Protein A affinity chromatography. Such single-point attachment may also occur by use of suitably reactive residues which are placed at an exposed amino acid position, namely in a loop, close to the N- or C-terminus or elsewhere on the outer circumference of the protein fold. Suitable reactive groups are e.g. sulfhydryl or amino functions.

In some embodiments, Protein A derivatives of variants are attached via multi-point attachment to suitable a chromatography matrix.

In general, biotechnological processes only provide highly impure mAbs in very low concentrations so that the removal of these impurities needs a set of complex isolation and purification steps, also referred to as downstream process. The efficiency of the downstream process affects the manufacturing costs of mAbs significantly, which results in the continuous ambition to improve the procedure of every sequential step [R. Freitag and C. Horváth; Adv. Biochem. Eng./Biotechnol., 1996, 53, 17-59]. Of all the processes steps involved, protein A chromatography (also referred to as affinity chromatography) is, invariably, the most crucial and expensive step. This means that Protein A affinity chromatography is one of the most crucial purification steps in the downstream processing of monoclonal antibodies mAbs.

In detail, the crude multi-component solution passes through a column packed with a stationary phase comprising immobilized protein A on a solid porous support. The desired mAb is captured by specific interactions between mAb and protein A while the impurities leave the column together with the leaving solvent. The captured mAb is recovered by usage of an appropriate eluant [P. Cuatrecasas, M. Wilchek, C. B. Anfinsen, Proc. Natl. Acad. Sci. USA, 61, 636 (1968)].

In practice, this bind and elute operation consists of a sequence of several steps. In the first step the column is washed with the buffer in which the target molecule containing feed-stream will be loaded. In the next step, feed stream, containing target mAb and impurities, is passed through the column containing protein A stationary phase. In this step the target mAb molecule is captured by the virtue of its specific affinity towards protein A, while the impurities mostly pass through. Subsequently the stationary protein A phase is flushed with the washing buffer to remove remaining impurities. Then, the captured mAb molecules are recovered (eluted) by passing elution buffer through the column. The elution of mAb is caused by the chemical environment generated by the elution buffer, which induces a shift in affinity between target mAb molecule and protein A. The column is finally cleaned and regenerated for repeat bind and elute of mAb for several more cycles.

Thus, affinity chromatography relies on very specific bonding interactions between target mAb and the surface of stationary phase. Ideally this specific binding should occur in such a way that every component of the starting mixture without substantial affinity to the surface passes through the chromatographic column, while the desirable molecule is retained. Various physiochemical interactions including electrostatic, hydrophobic, van der Waals and hydrogen bonding, the nature of the medium carrying the starting mixture, the complementary arrangement of the target molecule and the binding sites on the surface of the resin are typically responsible for a desired biospecifity [K. Huse, H.-J. Böhme and G. H. Scholz, J. Biochem. Biophys. Methods, 2002, 51, 217]. However, the bond between surface and biomolecule needs to be weak enough for elution by changing pH or salt concentration, or by addition of competitive inhibitor in solution [A. Jungbauer G. Carta, Protein Chromatography, WILEY-VCH Verlag, 2010; R. Freitag and C. Horváth, Adv. Biochem. Eng./Biotechnol., 1996, 53, 17; A. A. Shukla, B. Hubbard, T. Tressel, S. Guhan and D. Low, J. Chromatogr., B: Anal. Technol. Biomed. Life Sci., 2007, 848, 28; P. Cuatrecasas, M. Wilchek and C. B. Anfinsen, *Proc. Natl. Acad. Sci. U.S.A.*, 1968, 61, 636]. Obviously, efficiency and performance of the affinity chromatography depends on the described specific interactions of target molecules to the surface. However, due to the wide variety of mAbs produced, it is necessary that the design of stationary phases is evolved to the needs of specific mAb. Generally, such a design is achieved by modifying stationary phases with the ligand that possesses specific affinity for the mAb under consideration. In addition to the specific interactions, choice of a protein A chromatography medium depends on several further process parameters, such as strength (typically characterized by the pressure response to the applied flow rates), and stability to several solutions used in all the steps of protein A chromatography.

In summary, design of an efficient affinity chromatography medium requires judicious choice of the ligand, the stationary phase and strategy for attachment of ligand to the stationary phase. The choice of all these elements is governed by the specificity and efficiency in purifying mAbs, stability of the stationary phase as a whole, and ultimately, the cost of the affinity medium. Most ligands are suitable due to their natural affinity to the desirable molecule, e.g. antibodies, antigens, lectins, receptors, enzyme inhibitors, hormones or biomimetic ligands [R. Freitag and C. Horváth, Adv. Biochem. Eng./Biotechnol., 1996, 53, 17; K. Huse, H.-J. Böhme and G. H. Scholz, J. Biochem. Biophys. Methods, 2002, 51, 217]. Protein A is a successfully applied and well proved affinity ligand for the capture of monoclonal immunoglobulin G antibodies. [R. Freitag and C. Horváth, Adv. Biochem. Eng./Biotechnol., 1996, 53, 17; A. A. Shukla, B. Hubbard, T. Tressel, S. Guhan and D. Low, J. Chromatogr., B: Anal. Technol. Biomed. Life Sci., 2007, 848, 28; S. R. Narayanan, J. Chromatogr., A, 1994, 658, 237; K. Huse, H.-J. Böhme and G. H. Scholz, J. Biochem. Biophys. Methods, 2002, 51, 217; R. Hahn, P. Bauerhansl, K. Shimahara, C. Wizniewski, A. Tscheliessnig and A. Jungbauer, J. Chromatogr., A, 2005, 1093, 98]. While protein A imparts the specificity to the medium, the mechanical stability is primarily provided by the underlying support material. Several materials are used as a supporting material for protein A stationary phase. In addition to the mechanical strength, the supporting materials should also be able to provide high surface area to attach protein A in efficient fashion. Thus, a matrix is necessary which satisfies these claims and which is preferably mechanically and chemically stable.

Furthermore, an important feature of chromatographic columns is their life time. Affinity chromatography for industrial applications consists of four stages: adsorption, washing, elution, regeneration [S. R. Narayanan, J. Chromatogr., A, 1994, 658, 237]. So, performance of the columns is expected to be constant over the range of numerous cycles to guarantee the reproducibility of the process.

The high specifically bindings of mAb to immobilized protein A in affinity chromatography for purification of mAb is caused by interactions with the fragmental crystallisable (FC) regions of mAb and appropriate sites of protein A. Protein A originates from the bacteria *Staphylococcus aureus* and has actually the purpose to protect the bacteria from mammal's immune systems while binding IgG on a way that makes it inoperative. This skill is basically utilized, using protein A as affinity chromatography ligand. Protein A has five structurally related, homologous domains which can all bind to respective FC region of IgG [K. Huse, H.-J. Böhme and G. H. Scholz, J. Biochem. Biophys. Methods, 2002, 51, 217; S. Ibrahim, Scand. J. Immunol., 1993, 38, 368; S. Hober, K. Nord and M. Linhult, J. Chromatogr., B: Anal. Technol. Biomed. Life Sci., 2007, 848, 40]. Proteins are macromolecules and their activity is based on tertiary structures (e.g. FC region) so that their orientation in space and conditions like the media's pH are important influencing parameters for successfully complex building between ligand and target molecule—in this case between protein A and IgG. But the requirement of an appropriate, specific binding environment is on the other hand the key for the detachment during elution. The complex building of IgG FC region with protein A requires an appropriate orientation in pores. The 3D view and the arrangement of IgG-protA-complex are worked out by H. Yang et al. [H. Yang, P. V. Gurgel, D. K. Williams, Jr., J. Cavanagh, D. C. Muddiman and R. G. Carbonell, J. Mol. Recognit., 2010, 23, 27].

The difference in size dimensions is based on the molecular weight of both proteins, IgG (144 kDa) is significant bigger than protein A (40-60 kDa). Those facts need to be considered for pore structure design of supporting material.

Besides specific binding sites for mAb, protein A need to provide functional groups to achieve its immobilization on support material surface, keeping accessibility of active sites. Established handles for immobilization of protein A are amine groups and thiol groups which can be covalently attached to the stationary phase equipped with complementary reactive groups such as epoxy, carboxylic acid, or aldehyde, for example [H. Ahmed, Principles and Reactions of Protein Extraction, Purification, and Characterization, CRC Press LLC, 2004; P. Cuatrecasas, J. Biol. Chem., 1970, 245, 3059; Z. Pan, H. Zou, W. Mo, X. Huang and R. Wu, Anal. Chim. Acta, 2002, 466, 141]. There are wild type protein A equipped with suitable anchor groups, but alteration of protein A by mutation allows the creation of tailor made protein A molecules concerning the coupling chemistry, the performance and the alkaline resistance, attributable to the variation of amino acid residues. The availability of diverse protein A in regard to functional groups promotes the consideration of different immobilization strategies. One-point or multiple-point attachments, the choice of support material, and chemical surface activation dependent on functional groups of protein A are variables.

Multiple-point attachment compared with one-point attachment, for example, promises an improvement of durability of protein A immobilization to prevent any protein A leaching during mAb purification.

Thiols are generally more reactive than amines due to their stronger nucleophilic nature so that thiol containing protein A can be immobilized very efficiently on epoxy groups providing surfaces. There are also several coupling methods for ligands containing primary amines.

Focus of the current work is the application of protein A with multiple terminal amines for the immobilization on activated porous metal oxide particles.

Stationary Phase

While the specificity of interactions between mAb and surface is dependent on the PrA ligand, the porous matrices on which the protein A ligands are immobilized need to satisfy certain criteria. Membranes and monoliths have also been considered as supports for protein chromatography, but porous, micron size beads are typically the most popular and widely used choice for support materials [A. Jungbauer, G. Carta, in: Protein Chromatography, Process Development and Scale-Up; WILEY-VCH Verlag, Weinheim (Germany) 2010]. The efficiency of the protein A medium is generally measured in terms of the binding capacity (in static or dynamic mode) per unit volume of the resin. The binding capacity is a function of the physical attributes of the porous beads, such as surface area, pore size, pore volume, and bead size. However in general, increasing the surface area provides more functional groups per unit volume for attachment of protein A, and in turn, can increase the binding capacity.

However, increasing surface area may come at the cost of mechanical stability of the porous beads packed in a column.

The mechanically stability is necessary for the porous beads to withstand the operating flow rates and resulting pressure, because it is economical to operate at high flow rates as compared to low flow rates at the same dynamic binding capacity. However, such high rates cause dense packing of porous beads in the columns, and high pressure drops. From this point of view, it is desirable to use a material that has uniform particle size and narrow pore size distribution, and therefore, allows accurate packing. Particles with small pore diameter usually provide high surface areas. However, the pore size needs to be sufficient to allow diffusion of the biomolecules. Beside these physical attributes, the support material should also possess several chemical attributes. Because protein A chromatography operates on the principle of selective affinity between the desired molecule and the stationary phase, the stationary phase should ideally lack any potential of interaction (typically referred to as non-specific adsorptive interaction or binding) with the desired molecule. [A. Jungbauer, G. Carta, in: Protein Chromatography, Process Development and Scale-Up; WILEY-VCH Verlag, Weinheim (Germany) 2010]

In addition to the inherent needs, based on separation performance, recently, there is demand that the columns are regenerated ("cleaned") using aqueous sodium hydroxide solution. Such a practice, typically referred to as "clean-in-place" (CIP), requires that the support material should offer chemical resistance towards the high pH alkaline conditions [M. Rogers, M. Hiraoka-Sutow, P. Mak, F. Mann and B. Lebreton, J. Chromatogr., A, 2009, 1216, 4589].

With these criteria in mind, there are several supporting materials which are widely used in practice, including natural carbohydrate polymers, synthetic polymers, and inorganic materials. Natural carbohydrate polymers include agarose, cellulose, dextran and chitosan, are commercially available for protein chromatography application [A. Jungbauer, G. Carta, in: Protein Chromatography, Process Development and Scale-Up; WILEY-VCH Verlag, Weinheim (Germany) 2010].

First descriptions of the use of modified natural carbohydrate polymer for ion exchange date back to the 1950s [E. A. Peterson and H. A. Sober, J. Am. Chem. Soc., 1956, 78, 75131]. Typically, a porous agarose gel can be prepared by cooling a hot agarose solution. Primary feature of those materials is their hydrophilic character (low non-specific adsorption) and the accessibility to a high amount of hydroxyl groups for chemical modification and ligand immobilization so that high capacities are reachable. Additionally, carbohydrates are chemically resistant at extreme alkaline conditions, and therefore suitable for CIP.

However, because of low solid density, these agarose-based materials lack mechanical stability restricting their use at very high flow rates and pressure. The mechanical stability of these materials can be improved by chemical crosslinking. However, such chemical crosslinking typically use the hydroxyl groups as handles, limiting the extent to which the agarose gel can be crosslinked without sacrificing the hydroxyl groups available as handles for further ligand immobilization. As a result, the mechanical strength of these crosslinked agarose gels may not match competitive materials like inorganic materials.

Porous synthetic polymer beads are also used as stationary phase for affinity chromatography.

These synthetic polymer beads of desired particle sizes are usually prepared by suspension or emulsion polymerization using a judiciously chosen porogen, which also yields high surface areas. This suspension polymerization typically involves seeding a radical polymerization of a monomer with porogen, and has been proven to yield narrow distribution of particle sizes [T. Ellingsen, O. Aune, J. Ugelstad and S. Hagen, J. Chromatogr., 1990, 535, 147]. However, due to the nature of the synthesis of beads, and depending on the monomer used for the synthesis, synthetic polymers can be significantly more hydrophobic than natural carbohydrate polymers. Depending on the choice of monomer, polymer beads can also provide a high density of functional groups, available for surface modification, thus, hydrophilic surfaces can be obtained. Regardless, due to the commercial availability of large number of functional monomers, the polymer beads generated via suspension methods can be chemically diverse and highly tunable. Commonly used polymers are polyacrylamides and polyacrylates. 2-Hydroxyethyl methacrylate (HEMA) is an example for a high hydrophilic and biocompatible polymer [A. Jungbauer, G. Carta, in: Protein Chromatography, Process Development and Scale-Up; WILEY-VCH Verlag, Weinheim (Germany) 2010]. Due to their higher solid density those materials are usually more mechanically stable than carbohydrates, but they tend to swell in aqueous media the more hydrophilic they are. One more benefit is the high chemical resistance of polymer beads so that the CIP is expectably not affecting the performance of columns packed with polymer beads caused by damage of the resin structure.

A third class of supporting materials is inorganic, or ceramic, particles. Particles of that class are for example so called controlled pore glass (CPG) particles. FIG. 1 shows such particles and their pore structure.

Silica based beads, such as CPG as commercialized by Merck Millipore, have the highest solid density, and offer excellent mechanical strength. Especially the use of CPG with its large, interconnected and uniform pores enables excellent flow properties [Schnabel, R.; Langer, P., J. Chromatogr., 1991, 544, 137]. Moreover, a good mass transfer due to the morphology allows a quite unhindered pore diffusion of proteins so that these properties benefit higher scales. Maintaining of shape and excellent flow properties promote high flow rates with linear pressure increasing whereas the unhindered mass transfer allows short retention times. However, CIP is the main limitation in using inorganic supporting materials such as CPG [M. Rogers, M. Hiraoka-Sutow, P. Mak, F. Mann and B. Lebreton, J. Chromatogr., A, 2009, 1216, 4589]. Usually they are based on $SiO_2$ which is soluble in strongly alkaline media so that the lifetime of those columns is limited in the number of process cycles. Furthermore, higher non-specific bindings compared to agarose based materials are observed as well as the surface modification on inorganic supports is in general more challenging. Nonetheless protein chromatography media based on inorganic materials has been successfully established in this industrial setting where CIP with sodium hydroxide is not practiced.

Overall, each of the base matrices provides one or more advantages for protein A affinity media, but the most desirable improvement is in the caustic stability of CPG.

This means, for the use of porous inorganic particles, like CPG, with all its benefits in high scale protein A chromatography, the enhancement of the alkaline resistance is desirable. Several methods concerning this issue for silica based materials are described in literature. Many of them include procedures which are referred to as "end capping" reactions. Residual silanols are treated with chlorosilanes to shield the silica surface. This technique enhances the alkaline resistance but the lifetime is still not satisfying for high pH treatment, further it is more suitable in reversed phase chromatography application [Nawrocki, J., Dunlap, C., McCormick, A., Carr, P. W., J. Chromatogr., A, 2004, 1028, 1; Samuelsson, J. A., Franz, Stanley, B. J., Fornstedt, T., *J. Chromatogr., A,* 2007, 1163, 177; Kirkland, J. J., van Straten, M. A., Claessens, H. A., *J. Chromatogr., A,* 1995, 691, 3; Kirkland, J. J., van Straten, M. A., Claessens, H. A., *J. Chromatogr., A,* 1996, 728, 259].

Polymer coating on silica surfaces is a further option which is well investigated for plenty of polymers [Petro, D. Berek, M., Chromatographia, 1993, 37, 549 36]. For protein purification applications, significant enhancement of alkaline resistance of silica gel has been described after coating the surface with carbohydrate based polymers such as dextran or chitosan. Afterwards the polymeric surface is opened for commonly used modification strategies [Fengna Xi and Jianmin Wu, *React. Funct. Polym.,* 2006, 66, 682; E. Boschetti, P. Girot and L. Guerrier, J. Chromatogr., 1990, 523, 35]. In addition to these investigations J. Nawrocki et al. [J. Chromatogr., A, 2004, 1028, 1] compared the alkaline resistance of silica and various metal oxide based packings in an extensive report, as well as further important properties for chromatographic application.

Considering all these investigations, for immobilization of protein A onto the surface of porous beads, it is necessary that the surface offers a reactive handle that is suitable for functional groups of protein A. Obviously, protein A needs to possess the reactive functional groups without much adulteration in its structure and property.

OBJECT OF THE INVENTION

Thus it is the object of the present invention to provide on the one hand a suitable porous support material, which is stable in view of an alkaline attack and degradation, and on the other a suitable support material possessing functional groups for protein A immobilization. Furthermore it is an object of the present invention to provide a process for the preparation of this new material.

BRIEF DESCRIPTION OF THE INVENTION

The object of the present invention are separating materials for affinity chromatography based on hydroxyl-containing porous base supports, to the surfaces of which polymer chains are grafted by covalent bonding, in that
  a) two or more grafted polymer chains are initiated from one hydroxyl group on the surface, and that
  b) each polymer chain has multiple derivatizable groups for coupling affinity ligands. According to the present invention the porous base material for the production of the separating material may consist of a porous ceramic medium or a porous polymer support having hydroxyl groups at the surface. Suitable porous ceramic media as base support may comprise oxides of silicium, zirconium titanium, and their mixtures. Experiments have shown, that the new separating materials show good properties if the porous base support is a silica based porous medium or if the silica based porous medium is coated with zirconia or titanium oxide. According to the present invention separating materials for affinity chromatography with improved properties are provided by materials which are treated in a first production step with a tri- or more functional epoxide. Under suitable conditions the reacted tri- or more functional epoxides form a crosslinked coating rich in epoxy functionality. This means, that an improved separating material can be produced, comprising a porous base support covered with a crosslinked coating rich in aliphatic hydroxyl or diol groups for covalent bonding of graft polymer chains comprising acrylic acid or its derivative providing carboxylic acid groups.

Particularly suitable separating material according to the invention are those in which a porous base support is covered with a crosslinked coating rich in aliphatic hydroxyl or diol groups for covalent bonding of graft polymer chains by surface initiated polymerization of monomers selected from the group glycidyl methacrylate, vinyl azlactone, acrylic acid N-hydroxysuccinimide ester, methacrylic acid N-hydroxysuccinimide ester, providing reactive groups for further functionalization. Particularly good characteristics show inventive separating materials, wherein the porous base support is covered with a crosslinked coating rich in aliphatic hydroxyl or diol groups for covalent bonding of graft polymer chains built of acrylic acid or its derivative and a further monomer providing carboxylic acid groups and if each polymer chain of the separating material possesses multiple derivatizable groups for coupling protein A. Thus, advantageously protein A is coupled to reactive groups of the grafted polymer chains.

Here it has been found, that separating material for ion-exchange chromatography according to the present invention show especially good properties if the covalently bonded graft polymer chains are composed of
  monomers containing a functional group with a negative charge selected from the group maleic acid, acrylic acid, methacrylic acid, carboxyethylmethacrylamide, carboxyethylmethacrylamide, carboxylacrylamide, carboxymethacrylamide, carboxypropylacrylamide, carboxymethylacrylamide, 2-acrylamido-2-methylsulphonic acid, and acrylamideethane sulphonic acid
and/or
  monomers containing a functional group with a positive charge selected from the group 2-(diethylaminoethyl) acrylamide, 2-(diethylaminoethyl)methacrylamide, 2-(acryloylaminoethyl)-trimethylammonium chloride, 3-(acryloylaminopropyl)-trimethylammonium chloride, 2-(dimethylaminoethyl)methacrylamide, 2-(dimethylaminoethyl)acrylamide, 2-(diethylaminopropyl) acrylamide, 2-(diethylaminopropyl)methacrylamide, 2-(methacryloylaminoethyl)-trimethylammonium chloride, and 3-(methacryloylaminopropyl)-trimethylammonium chloride
and optionally
  hydrophobic monomers comprising linear or branched alkyl, aryl, alkylaryl, arylalkyl having up to 18 carbon atoms, which optionally contain hydrophilic groups selected from the group consisting of alkoxy, cyano, carboxy, acetoxy and acetamino.

Separating materials for affinity chromatography of the present invention are prepared in a process characterised in that a porous base support medium is
  a) reacted with a trifunctional epoxide,
  b) graft polymerized with chains comprising acrylic acid or its derivative providing carboxylic acid groups onto the coating of step a), which is rich in aliphatic hydroxyl or diol groups and that
  c) protein A is coupled to reactive groups of the grafted polymer chains.

Advantageously a porous silica base support medium is coated with zirconium oxide or titanium oxide before reacting with a multifunctional epoxide, especially with a tri- or more functional epoxide, to improve the caustic stability of the produced separating material.

A further object of the present invention are chromatography columns, containing a separating material as disclosed here and their use for the removal of biopolymers from liquid media. Especially the inventive separating materials are suitable for use in affinity chromatography, whereby the biopolymer is adsorbed to the separating material by interaction with coupled protein A and/or the ionic groups of grafted polymer chains and optionally with hydrophobic groups and is desorbed either by a) increasing the ion strength and/or
b) by modifying the pH
in the solution
and/or
c) through the use of an eluent having a different polarity to that of the adsorption buffer.

DETAILED DESCRIPTION OF THE PRESENT INVENTION

Protein A possesses different reactive groups which can be used for immobilization on a suitable carrier. Thiols or amines are common functional groups of protein A for reaction [H. Ahmed, Principles and Reactions of Protein Extraction, Purification, and Characterization, CRC Press LLC, 2004; Z. Pan, H. Zou, W. Mo, X. Huang and R. Wu, Anal. Chim. Acta, 2002, 466, 141]. Our experiments have shown that amine groups are unexpectedly particularly suitable for the immobilization reaction whereas the molecule structure of protein A remains as far as possible unchanged. FIG. 2 shows schematically the immobilization reaction of protein A with hydroxyl groups on the surface of a suitable carrier.

In general, amine containing ligands are coupled to the carrier surface by hydroxyl groups, using reagents, such as, cyanogen bromide, oxiranes, tresyl chloride, divinylsulfone, benzoquinone carbodiimidazole.

A suitable way to add suitable functional groups on metal oxide surfaces via grafted polymers seems to be the application of a respective monomer which possesses amine reactive side groups. This requirement is fulfilled by the use of glycidyl methacrylate (1) and acrylic acid (2) as repetitive units. Both monomers are commercially available and their handling is uncomplicated:

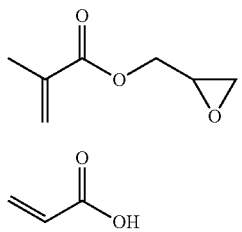

While epoxy rings of glycidyl methacrylate are available for nucleophilic attack by amines, carboxylic acid groups of acrylic acid offer formation of peptide bounds with protein A, enabled by the aid of a carbodiimide.

Scheme 1:

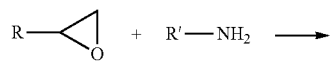

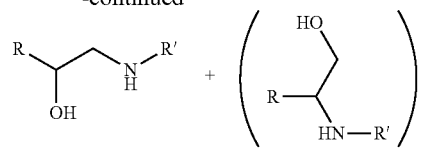

Scheme 2:

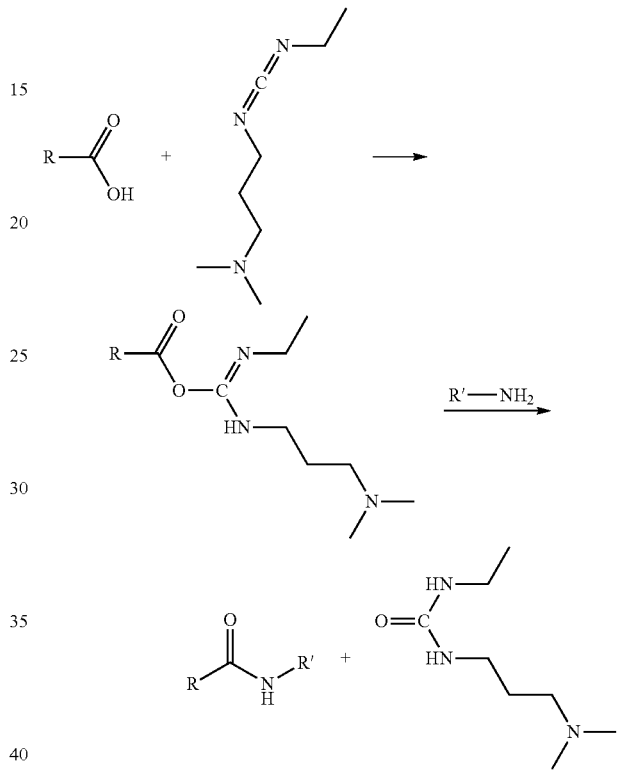

For an efficient, homogeneous and exhaustive surface modification, the metal oxides need to be activated to increase the amount of surface hydroxyls. Methods concerning this issue are described in literature, applying common chemical treatments with mineral acids, sodium hydroxide or plasma. Zirconia lacks the modifiable surface hydroxyl groups and further surface activations is desirable to increase the chance of homogenously polymer grafting.

An established method for ligand coupling on hydroxyls providing surfaces, such as carbohydrates and $SiO_2$, succeeds with the use of bisoxiranes (e.g. 1,4-butanediol diglycidyl ether), whereas one epoxy group attaches to the surface, and the second one binds to the ligand [Platis, D., Labrou, N. E.; J. Sep. Sci., 2008, 31, 636; Head, D. M., Andrews, B. A., Asenjo, J. A., Biotechnol. Tech., 1989, 3, 27]. For the purpose of aliphatic hydroxyl group generation, instead of the coupling reaction, the remaining oxiranes are hydrolyzed to generate desirable hydroxyl groups. A further advantage of this strategy is the insertion of a spacer. Dependent on the length of the aliphatic backbone, potential grafting reactions are less influenced by interactions with the underlying ceramic surface and also, the alkyl chain causes an increased accessibility of the hydroxyl groups for reactants due to its flexibility.

The increase of hydroxyls is expected to be an improved by the use of trimethylolpropane triglycidyl ether (3) (TMTGE) as a trisoxirane. The principle of above described surface activation is illustrated in Scheme 3. In the current approach, instead of a hydrolysis, the epoxy groups are quenched with thiolglycerol (4) to multiply the hydroxyl groups, available for further modification. In addition, the diol groups provided by thioglycerol are also suitable for initiation by Ce(IV)-mediated polymerization.

Scheme 3:

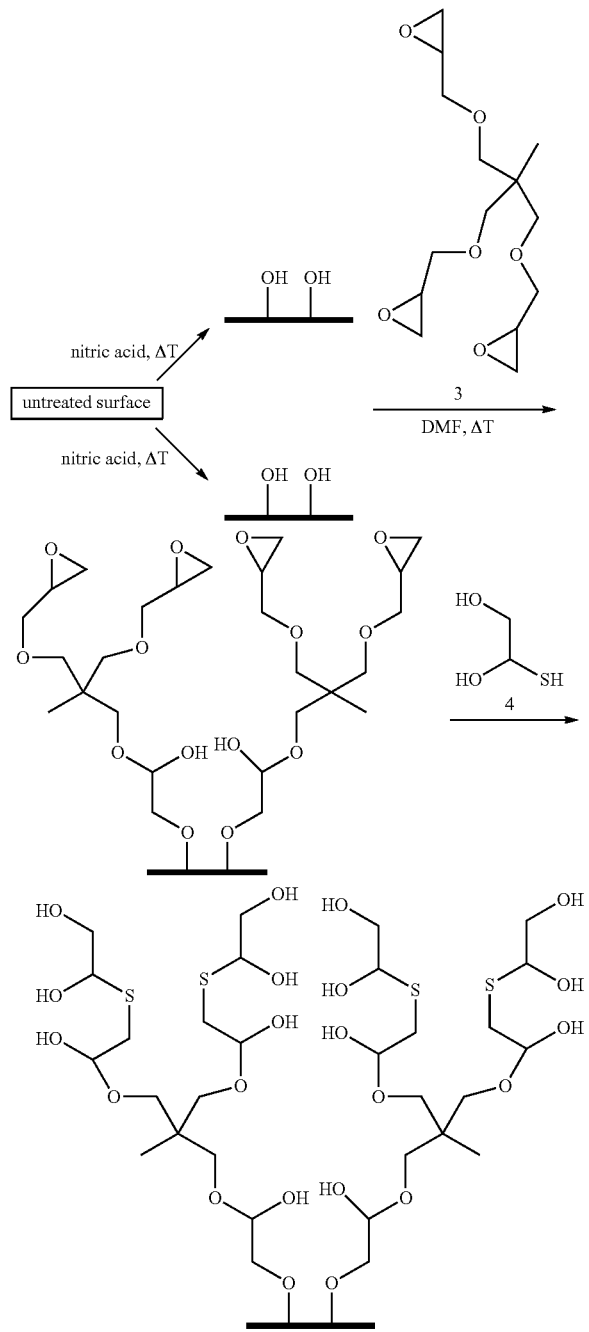

Advantageously the use of TMTGE offers the possibility of building up a crosslinked horizontal network due to its epoxy residues in order to cover surfaces that lack modifiable hydroxyl groups, and to make them accessible for grafting polymerization.

There are two approaches for immobilizing polymers via covalent bond on solid surfaces:
grafting-from
and
grafting-to.

Using the grafting-to method, the already synthesized polymer reacts via one or multiple anchor groups with reactive groups on the surface. Main feature of this technique is the option to use tailor made chains with desirable molecular weight and weight distribution as well as composition of co-polymers, block co-polymers or other special polymer architectures [Huang, J., Koepsel, R. R., Murata, H., Lee, S. B., Kowalewski, T., Russell, A. J., Matyjaszewski, K.; Langmuir, 2008, 24, 6785]. In contrast, in the grafting-from method, the initiation of polymerization is located at the solid surface so that the polymer chains grow up from the solid matrix by conventional polymerization mechanisms, whereby the growing radical attacks the surrounding monomers.

Generally, the grafting-from technique allows for high grafting density of polymer chains as compared to grafting-to technique because of easier mass transfer of small monomers as compared to the long polymer chains that need to access the reactive sites in the surface through the continuously building polymer layer. With high enough graft density, polymer chains extend away from the surface due to the repulsion between the neighboring chains to form a "polymer brush".

While ATRP offers several advantages, it requires immobilization of initiator to the surface prior to the polymerization step. In contrast, initiation by cerium(IV)-salts requires reducing groups, such as hydroxyl groups, at the surface for initiation, and can be very effective to conduct single-step polymerization. In the majority of cases this Ce(IV)-based technique is applied to surfaces with aliphatic hydroxyls.

The properties of grafted polymer in regard to graft density, chain conformation, and molecular weight distribution are dependent on polymerization technique, and the difference in polymerization conditions that govern the polymerization itself. In this work, ATRP and Ce(IV)-initiated polymerization were adapted to the grafting polymerization due to their unique advantages: while ATRP is a well-controlled polymerization method, Ce(IV) is simple and can be directly performed from the surface with hydroxyl groups.

Controlled radical polymerization combines the benefits of living polymerization and free radical polymerization. On one hand, the creation of tailor made polymer with narrow chain length distribution and desirable architectures (e.g. block-co-polymer) is enabled, caused by the living character. On the other hand, this method is tolerant towards most functional groups so that the application of a broad spectrum of monomer is available, like in ordinary radical polymerization methods [K. Matyjaszewski and J. Xia, Chem. Rev., 2001, 101, 2921] following the general principle of transition metal catalyzed ATRP:

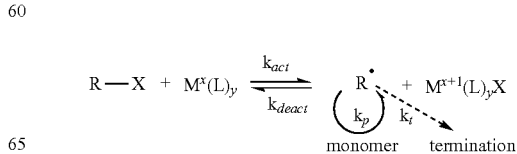

Radicals (active species) are generated by reversible atom transfer of a halogen atom X from the alkyl halide (dormant species) to the transition metal complex $M^x(L)_y$. In the presence of vinyl monomers, polymer chains are built up by a propagation step similar to conventional radical polymerizations. Termination reactions are promoted by high radical concentration, and therefore, the concentration of active species needs to be regulated.

Main premise for successful polymerization is the application of transition metal complexes in appropriate oxidation stage which are usually easy oxidizing. Therefore, an absolute oxygen free system is required.

Much more tolerant towards air and, thus, a much more robust technique is referred to as activator generated by electron transfer atom transfer radical polymerization (AGET ATRP). The transition metal in the oxidation stage that allows the atom transfer for activation is generated in situ using a reducing agent. Principle of AGET ATRP is shown by Jakubowski, W., et al. Macromolecules, 2006, 39, 39], the sole difference to the preceding is the required in situ generation of $M^x(L)_y$ by a reducing agent which gets simultaneously consumed [Jakubowski, W., et al. Macromolecules, 2006, 39, 39; Min, K. et al., Macromolecules, 2007, 40, 1789].

Scheme 5:

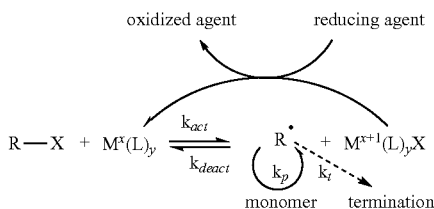

AGET ATRP can be easily used for grafting from polymerization by the immobilization of an ATRP initiator on substrate surface. Substrates need to provide appropriate anchor functionality to immobilize initiator molecules, even polymers including respective halides can be used such as poly(vinyl benzyl chloride) so that no immobilization is necessary in this case. [Bayramoglu, G., et al., Colloids Surf., A, 2009, 345, 127]

ATRP has been successfully applied to various monomers, containing substituents which can stabilize the propagating radicals, such as styrenes, (meth)acrylates, (meth)acrylamides, dienes and acrylonitrile. Due to the chemical nature, each monomer causes a unique equilibrium rate so that optimized polymerization conditions are not easily transferable. Acidic monomers like (meth)acrylic acid can poison the catalyst by coordinating to the transition metal. They can also protonate nitrogen containing ligands, which interferes with the metal complexation ability.

The amount of initiator molecules determines the number of growing chains. Important for narrow molecular weight distribution and uniform chain growing is the rapid and complete initiation. Typically used ATRP initiators are alkyl halides including halogenated alkanes, benzylic halides, α-haloester, α-haloketones, α-halonitriles and sulfonyl halides. Structural resemblance of monomer and initiator are beneficial so that α-bromoisobutyrates (A) are good initiators for the ATRP of methacrylates (B), while α-bromopropionates (C) are used for the polymerization of acrylates (D).

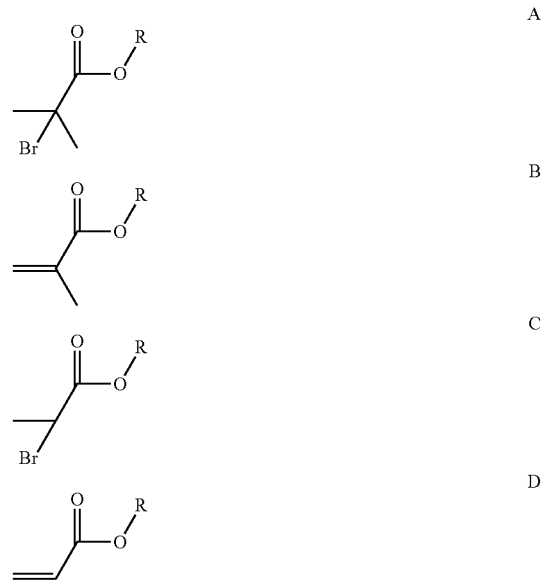

For SI ATRP, the initiator is supposed to be immobilized on the substrate surface. According numerous reports, the immobilization succeeds using suitable silane chlorides (E), alkoxysilanes (F) on silica surfaces or α-bromo isobutyryl bromide (G) on any hydroxyl groups providing substrate [Kowalewski, R., et al., Eur. Phys. J. E: Soft Matter Biol. Phys., 2003, 10, 5; Cao, L., et al., Proceedings Published by the American Chemical Society, 2011; Nair, M. B., Blum, F. D.; Polym. Prepr. (Am. Chem. Soc., Div. Polym. Chem.), 2008, 49, 485].

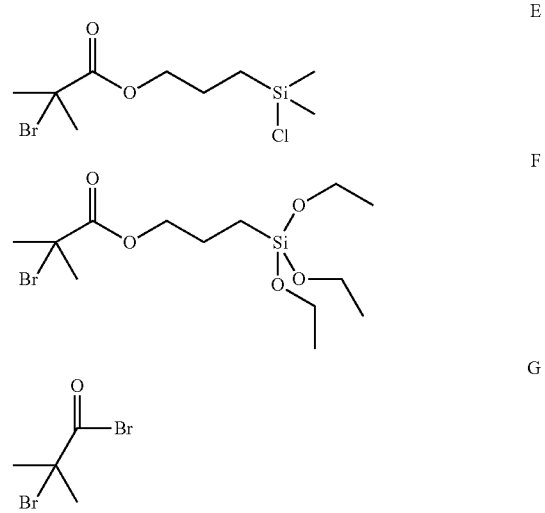

Numerous catalyst systems for ATRP are described in literature, including transition metals from 6th to 11th group of periodic table of the elements. Of all the transition metals, copper catalysts are the most propagated, superior in terms of versatility and costs. Besides the transition metal species, for a working catalyst system is also a suitable ligand required which usually promotes solubility as well as the activity of the catalyst. Multidentate aliphatic amines are established as ligands for copper catalyzed ATRP; 2,2'- bipyridine (Bpy) and N,N,N',N',N''-pentamethyl-diethylen-etriamine (PMDETA) are common ligands for copper complexes in ATRP.

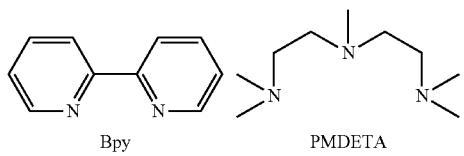

As mentioned before, the crucial distinction of ATRP to AGET ATRP is the application of a reducing agent to generate activating transition metal complexes in situ. In copper based systems, this means the in situ generation of Cu(I) complexes from oxidatively stable Cu(II) species. The advantage of this technique is the improved robustness compared to conventional ATRP. In addition, the required amount of catalyst is decreased: all metal complexes can be activated by reducing agent and lost active species caused by termination are regenerated. Successfully applied reducing agents in AGET ATRP include tin(II) species (e.g. thin(II) 2-ethylhexanoate), phenols, glucose, hydrazine, gallate, and ascorbic acid.

The entire reaction scheme of a copper catalyzed SI AGET ATRP of methacrylate monomers on hydroxyl group providing surfaces is depicted in the following scheme:

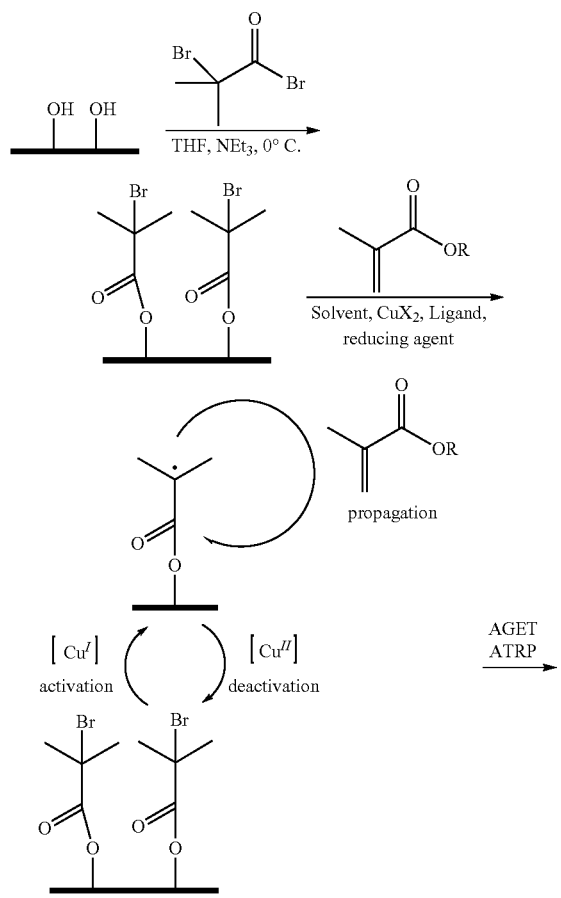

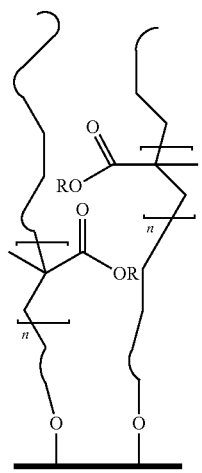

The initiation of polymerization may also be caused by a cerium(IV) salt, such as, cerium ammonium nitrate. In this case the reaction is based on the release of free radicals as a consequence of a redox reaction, first described in 1958 by G. Mino and S. Kaizerman [Mino, G., Kaizerman, S., J. Polym. Sci., 1958, 31, 242]. The oxidation-reduction system usually consists of the cerium salt and an organic reducing agent such as alcohols, thiols, glycols, aldehydes, and amines.

The redox system in the case of an alcohol is depicted in the following equation; "Ce(IV)" represents the ceric complex existing in aqueous solution.

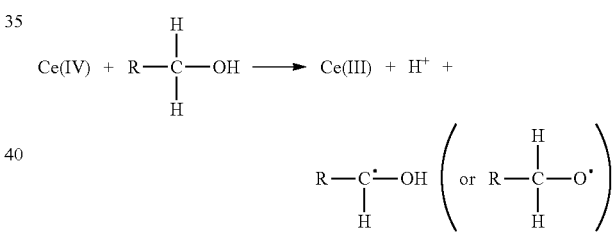

In presence of vinyl monomer, this reaction causes a radical polymerization. For the use of substrates, such as, cellulose, starch, or poly(vinyl alcohol), this process results in graft polymers.

Grafting polymerization from hydroxyl groups with Ce(IV) salts is described for numerous vinyl monomers, where the chain growth is initiated by the generated radical. Mechanism and kinetic is similar to a free radical polymerization, including termination and transfer reactions. Compared with free radical polymerization in solution, the surface initiated version usually shows increased terminations caused by high local radical concentration. Typical substrates are poly(vinyl alcohol), cellulose, starch, and other natural carbohydrates. The general process brings the benefit of high robustness compared with other surface initiated polymerization. Furthermore, compared with SI ATRP, no specialized initiator needs to be immobilized in a separate reaction step for Ce(IV) initiated graft polymerization. In addition, the polymerization of acidic monomer is easily possible, even ideal because the Ce(IV) initiation is typically performed in acidic aqueous media.

As described above, proteins and especially monoclonal antibodies unfortunately are obtained from cell cultures in low concentrations and with a high amount of impurities. However, exceptional purities are necessary if these compounds are desired products for pharmaceutical applications.

Therefore, also the manufacturing costs monoclonal antibodies (mAbs) are significantly influenced by the efficiency of recovery and purification of the desirable protein, which constitute a critical part of the production process. The set of the complex isolation and purification steps for recovery of proteins is generally referred to as downstream processes [R. Freitag and C. Horváth, Adv. Biochem. Eng./Biotechnol., 1996, 53, 17].

Of the several downstream processes, protein A chromatography (also referred to as affinity chromatography) is one of the most crucial steps in mAb purification due to high specific affinity of protein A to mAbs. The crude multicomponent solution passes through a column packed with a stationary phase with immobilized protein A. The desired mAb is captured by specific interactions between mAb and protein A while the impurities leave the column with the solvent. Afterwards the captured mAb is recovered by usage of an appropriate eluant [P. Cuatrecasas, M. Wilchek and C. B. Anfinsen, *Proc. Natl. Acad. Sci. U.S.A.*, 1968, 61, 636].

There are three common types of supporting particles used for protein A chromatography:
  natural carbohydrate polymers (e.g. agarose, cellulose),
  synthetic polymers (e.g. poly acrylamide, poly acrylates) and
  inorganic materials (e.g. silica, porous glass, zirconia oxide or titanium oxide).

Each material shows several advantages and disadvantages. As such inorganic materials, like porous glass are preferred because of their high rigidity in comparison to the polymeric competitors. They offer constancy in shape and pore size while increasing the flow rate and consequently the pressure. Large pores, well defined and variable in diameter, together with excellent flow properties, despite their non-spherical shape allow controlled pore glass (CPG) the application as protein A resin in large scale therapeutic antibody purification, but the challenge is its lack of caustic stability this inorganic porous separation material. Advantageously it is possible to eliminate this weakness by the present invention and a long lifetime and constant performance of chromatography columns can be ensured especially in presence of sodium hydroxide, which is one of the most commonly used mediums for cleaning chromatography media in downstream processes.

Metal oxides having a significant higher chemically resistance than silica like zirconia and titania, guarantee comparable high mechanical stability but are limited in the amount of reactive surface hydroxyl groups so that conventional surface modifications with "small molecules" are less efficient and, thus, result in lower ligand density.

But now, according to the present invention it is possible to compensate the lack of initial handles by the use of polymeric modifications with appropriate repetitive units, and a multiplication of desirable functional groups for protein A attachment is achievable.

The success of particle modification is primarily measured by ligand density $LD_{BCA}$ and the static binding capacity $Q_s$ for Immunoglobulin G.

Particularly, the grafting polymerization of suitable monomers by cerium(IV)salt initiation and by surface initiated activator generated by electron transfer atom transfer radical polymerization (SI AGET ATRP) is disclosed here. Although zirconia surfaces are more resistant to chemical reaction unexpectedly they can be modified according to the present invention by adapted methods as can be shown in the following examples.

The capability to immobilize protein A and the resulting chromatographic performance of prepared materials is supported by several analytics. Besides the validation of protein A presence and accessibility by $LD_{BCA}$ and Qs measurement, the modified particles are characterized by elemental analysis and titration of functional groups to determine the grafting quantity.

Material Characterization

Grafting of solid substrates with Ce(IV)-mediated free radical and SI AGET ATRP process has been extensively studied. The bulk of this literature is focused on the low surface area substrates, such as, films and fibers, and describes the effect of various polymerization parameters on the grafting performance as evaluated typically by the grafting yield, monomer conversion, graft lengths. However, according to the present invention grafted polymers with derivatizable handles on porous metal oxide particles have a great influence on the suitability of these modified particles for protein A immobilization for affinity chromatographic application.

Because polymerization in the current case takes place in a porous system, and that unhindered accessibility of functional groups as well as accessibility of immobilized PrA for IgG capturing cannot be assumed, the correlation of grating performance to the final chromatographic performance is not trivial. Therefore, potential polymerization affecting parameters, such as, type of monomer, surface treatment prior to the grafting, polymerization temperature, polymerization time, monomer concentration, and initiator concentration are found to interact with regard to their influence on the system under consideration. CPG as porous inorganic carrier is grafted with polymers with functional handles under varying conditions, and protein A is attached to the potentially handles represented as pendant functional groups. The resulting chromatographic performance, dependent on polymerization conditions, is mostly measured by ligand density and static binding capacity, and the findings are compared with literature reports for grafting performance under respective conditions. ProSepHC is used as a control for variability and as a performance target. In addition to simply testing the chromatographic performance as a function of various polymerization parameters, grafting performance was correlated with the chromatographic performance. Such study was necessary to understand the opposing factors in play due to limited available space in the pores, and the need of accessible active sites of PrA for efficient IgG capturing.

Furthermore, conditions for PrA coupling are varied within the scope of this exploration. This additional investigation also led to a better understanding of correlation between polymer tentacle properties and the resulting chromatographic performance.

Ce(IV) Initiated Graft Polymerization

In the following studies are documented referring to the effect of trimethylolpropane triglycidyl ether (TMTGE) coating initiated by Ce(IV) initiated graft polymerization.

As zirconia particles are stable versus caustic attack the surface activation of zirconia particles which lack hydroxyl groups on surface is tried according to the present invention and an additional step for treatment of porous particles with TMTGE coating is introduced in order to increase the number of reactive hydroxyl groups for effective Ce(IV) chemistry. The TMTGE coating proceeds as a thermal statistical reaction involving surface hydroxyl groups and the epoxy groups of TMTGE.

At first, TMTGE coating was followed by direct protein A coupling with residual epoxy groups as anchor using the customary epoxy-amine chemistry and the resulting ligand density is used as a measure for optimization. Results of these coating experiments are shown in FIGS. 3a) and b), wherein the dependence of the $LD_{BCA}$ on reaction time and temperature at identical coupling conditions is shown [$LD_{BCA}$ of protein A coupled CPG, coated with TMTGE, as a function of reaction time at 80° C. (a), and of reaction temperature for 4 h reaction time (b)].

FIG. 3 shows the dependence of the $LD_{BCA}$ on reaction time and temperature at identical coupling conditions.

Based on the results in FIG. 3, the success of TMTGE coating is qualitatively confirmed: at high temperature of 80° C. and reaction time of 4 h, maximum $LD_{BCA}$ was achieved. Additional attempts demonstrated adequate reproducibility of this step. As result, the pretreatment of porous particles with TMTGE for four hours at 80° C. was used for the investigation of the influence of polymerization conditions.

In order to ensure that the coating with TMTGE is necessary for effective grafting, the influence of this pretreatment step on grafting process, monitored by ligand density and static binding capacity, was first investigated. For this purpose, coated and uncoated CPG particles were grafted with pAA by Ce(IV)-mediated polymerization of acrylic acid and consequently, pendant carboxylic acid groups of pAA were coupled with PrA under identical conditions. FIG. 4a and FIG. 4b show the effect of TMTGE coating on static binding capacity and ligand density of the final resin at different concentrations of AA and CAN, respectively [Static binding capacity (a) and ligand density (b) of coated and uncoated samples with different monomer concentration at 40° C., and [CAN] of 0.03M] and FIG. 5 show the static binding capacity (a) and ligand density (b) of coated and uncoated samples with different initiator concentration at 40° C., 0.15M acrylic acid.

As shown in the Figs, while the difference between the $Q_S$ and $LD_{BCA}$ of uncoated and TMTGE coated samples is amplified at higher [AA], [CAN] does not have a significant effect on the difference. Regardless, coating CPG with TMTGE leads to higher ligand density and static binding capacity as compared to untreated CPG regardless of the choice of polymerization conditions tested in this set of experiments.

It should also be noted that even though $Q_S$ and $LD_{BCA}$ values of resin synthesized using uncoated CPG are lower compared to the coated CPG, these values are still significant higher than $Q_S$ and $LD_{BCA}$ observed on bare CPG and shows that Ce(IV)-mediated polymerization is successful, albeit inefficiently, even with untreated CPG. It is also consistent with majority of literature reports, which describe applications of Ce(IV) initiated graft polymerization using aliphatic hydroxyl provided by substrates such as carbohydrates. Nevertheless, the advantage of TMTGE coating under these polymerization conditions is clearly recognizable.

Thus, further investigations of Ce(IV) initiated polymerization are solely focused on the correlation of $LD_{BCA}$, $Q_S$, and grafted polymer on TMTGE coated CPG as a substrate. The TMTGE coated CPG were used to polymerize both glycidyl methacrylate and acrylic acid. Although through further experiments, it was found that monomers selected from the group glycidyl methacrylate, vinyl azlactone, acrylic acid N-hydroxysuccinimide ester and methacrylic acid N-hydroxysuccinimide ester, providing reactive groups for further functionalization, are also particularly suitable for the preparation of new separation materials according to the present invention. But in order to keep the number of experiments in an acceptable range, the experimental plan was limited as described above to the use of glycidyl methacrylate and acrylic acid.

In the scope of the invention separating materials for Ion-exchange chromatography are especially porous base support materials covered with a coating rich in aliphatic hydroxyl or diol groups for covalent bonding of graft polymer chains composed of monomers containing a functional group with a negative charge selected from the group maleic acid, acrylic acid, meth acrylic acid, carboxyethylmethacrylamide, carboxyethylmethacrylamide, carboxylacrylamide, carboxymethacrylamide, carboxypropylacrylamide, carboxymethylacrylamide, 2-acrylamido-2-methylsulphonic acid, and acrylamideethane sulphonic acid and/or monomers containing a functional group with a positive charge selected from the group 2-(diethylaminoethyl) acrylamide, 2-(diethylaminoethyl)methacrylamide, 2-(acryloylaminoethyl)-trimethylammonium chloride, 3-(acryloylaminopropyl)-trimethylammonium chloride, 2-(dimethylaminoethyl)methacrylamide, 2-(dimethylaminoethyl)acrylamide, 2-(diethylaminopropyl) acrylamide, 2-(diethylaminopropyl)methacrylamide, 2-(methacryloylaminoethyl)-trimethylammonium chloride, and 3-(methacryloylaminopropyl)-trimethylammonium chloride and optionally hydrophobic monomers comprising linear or branched alkyl, aryl, alkylaryl, arylalkyl having up to 18 carbon atoms, which optionally contain hydrophilic groups selected from the group consisting of alkoxy, cyano, carboxy, acetoxy and acetamino.

As described previously, each of these monomers offer derivatizable pendant groups after polymerization.

Particular preference is given to separating materials which comprise a covalently bonded graft polymer on the surface, prepared using at least one monomer unit which has a pronounced hydrophobic content in the form of at least one alkyl and/or aryl group having a suitable number of carbon atoms. Separating materials of this type have proven particularly effective in accordance with the invention owing to the possibility of interacting with the biopolymer to be removed both by means of the hydrophobic content and also by means of the charged content of the graft polymer.

Consequently, derivatisation using at least one monomer unit having a hydrophobic content, selected from the group of the alkyl vinyl ketones, aryl vinyl ketones, arylalkyl vinyl ketones, styrene, alkyl acrylates, aryl acrylates, arylalkyl acrylates, alkylaryl acrylates, alkyl methacrylates, aryl methacrylates, arylalkyl methacrylates and alkylaryl methacrylates is particularly desirable.

Separating materials in accordance with the present invention can therefore be prepared using at least one monomer unit comprising a hydrophobic group which is selected from the group methyl, ethyl, propyl, butyl, pentyl, hexyl, heptyl, octyl, nonyl, decyl, 2-, 3-, or 4-oxapentyl, 2-, 3-, 4- or 5-oxahexyl, 2-, 3-, 4-, 5- or 6-oxaheptyl, 3-butoxypropyl, isopropyl, 3-butyl, isobutyl, 2-methylbutyl, isopentyl, 2-methylpentyl and 3-methylpentyl, but also from the group 2-oxa-3-methylbutyl, 2-methyl-3-oxahexyl, 2-phenyl-2-oxoethyl, phenoxyethyl, phenyl, benzyl, phenylethyl and phenylpropyl, whereby the latter group induces a hydrophilic effect, which can enter into desirable interaction with biological molecules.

At first, GMA was polymerized because it can be directly coupled with protein A whereas other carboxylic groups typically require an intermediate.

The Ce(IV)-initiated grafting of GMA is performed at several concentrations of GMA at [CAN]=0.03M, and different mixtures of DMF-water and water only. To prove the success of grafting pGMA from controlled porous glass particles, polymerization is followed by elemental analysis. Using the carbon content C % of the grafted CPG and the initial applied GMA per gram of CPG for polymerization $n_{GMA,0}$, the grafting yield Y % is calculable according the following equations:

$$n_{GMA,CPG} = \frac{C\%}{M_{carbon} \cdot 7}$$

$$Y\% = \frac{n_{GMA,CPG}}{n_{GMA,0}}$$

$n_{GMA,CPG}$=mol GMA per g of grafted CPG
$M_{carbon}$=atom mass of carbon
1 mol GMA includes 7 mol carbon For a Ce(IV)-mediated polymerization of GMA at [GMA]=0.1M, [CAN]=0.03M, T=40° C., t=22 h, carbon content and grafting yield are observed to be C %=0.75 w/w and Y %=15%. The positive and significant values for both C % and Y % indicate the successful polymerization of GMA.

However, as described previously, for the purpose of using a resin in protein A chromatography, the ability to couple protein A and maximized the binding capacity is more important than the grafting yield. Therefore, the pGMA grafted CPG samples are further characterized by determination of ligand density and static binding capacity after protein A coupling. Results for $Q_S$ and $LD_{BCA}$ for pGMA grafted CPG with different monomer concentrations are plotted in FIG. 6 [$LD_{BCA}$ and $Q_S$ of GMA grafted CPG with GMA concentration of 0.025M, 0.1M, and 0.27M; comparing with pure CPG and ProsepHC].

As shown in FIG. 6, pGMA-grafted CPG after the protein A coupling step possesses either no or negligible ligand density and static binding capacity. The $Q_S$ values are either the same or lower than the values observed with bare CPG due to non-specific binding. Additionally, the $Q_S$ values are lower than values obtained with pAA-grafted CPG synthesized at comparable [AA] at unoptimized conditions. While protein A coupling conditions for pGMA-coated CPG were not optimized for these studies, $Q_S$ values similar to or lower than bare CPG for the range of tested conditions were somewhat surprising given the high grafting yields reported in literature. Previous reports describe high grafting yields, negligible amounts of free polymer, and in one report the evidence of epoxy groups on the surface as characterized by IR spectroscopy [R. Murugan and S. Ramakrishna, Colloid Polym. Sci., 2004, 282, 1316].

But surprisingly the results in FIG. 6 indicate that no epoxy groups are left after polymerization. Generation of a cross linked poly(glycidyl methacrylate) caused by hydrolysis of epoxy groups and subsequent initiation explains the excellent graft performance of GMA. Additionally, cerium ammonium nitrate is a strong oxidizing agent and is capable to oxidize the majority of organic components, including DMF, toluene, and acetone. During reaction it is found that the typical yellow color of reaction solution in case of AA polymerization disappears in the case of polymerization of GMA. Such yellow color is attributed to the Ce(IV) species that are responsible for creation of radicals, indicating the exhausting consumption of Ce(IV).

In summary, the exhaustive initiation and polymerization of GMA with no and minimal leftover epoxy groups, and complete consumption of Ce(IV) species during polymerization results in the pGMA coating without any ability for PrA coupling. This means that surface activation of porous metal oxide particles by Ce(IV) initiated graft polymerization of GMA are not suitable for synthesis of PrA affinity resin. The loss of epoxy groups during polymerization hinders a successful immobilization of protein A on the surface.

In comparison to GMA, AA polymerization under the same conditions results in measurable ligand density and static capacity higher than that of bare CPG without any surface treatment. This is due to the fact that initiation from the hydroxyl groups of acrylic acid is not as efficient compared to diol groups generated by hydrolysis of epoxy groups. Regardless, initiation of polymerization from hydroxyl groups of poly(acrylic acid) graft does not effectively consume the carboxylic acid required for coupling. Therefore, further optimization of static binding capacity of the media synthesized by Ce(IV)-initiated grafting is done with acrylic acid as monomer.

While $Q_S$ and $LD_{BCA}$ vary with different polymerization parameters for TMTGE coated CPG, no dependence is observed in case of Ce(IV)-mediated initiation from uncoated CPG. This is why all the experiments are conducted with TMTGE coated particles. The range of different variables studied is presented in Table 1.

TABLE 1

Varied parameters for graft polymerization of acrylic acid on non-coated CPG.

| variable | range |
| --- | --- |
| polymerization temperature | 40-60° C. |
| polymerization time | 6-22 h |
| acrylic acid concentration | 0.09-1.1 mol/L |
| CAN concentration | 0.003-0.1 mol/L |

In addition to these optimization experiments for grafting acrylic acid and its derivatives like glycidyl methacrylate, and vinyl azlactone a vast group of polymers may be grafted to the porous support materials in order to produce separating materials with adapted properties.

Suitable monomers may be:

monomers containing a functional group with a negative charge selected from the group maleic acid, acrylic acid, methacrylic acid, carboxyethylmethacrylamide, carboxyethylmethacrylamide, carboxylacrylamide, carboxymethacrylamide, carboxypropylacrylamide, carboxymethylacrylamide, 2-acrylamido-2-methylsulphonic acid, and acrylamideethane sulphonic acid; monomers containing a functional group with a positive charge selected from the group 2-(diethylaminoethyl)acrylamide, 2-(diethylaminoethyl)methacrylamide, 2-(acryloylaminoethyl)trimethylammonium chloride, 3-(acryloylaminopropyl)trimethylammonium chloride, 2-(dimethylaminoethyl)methacrylamide, 2-(dimethylaminoethyl)acrylamide, 2-(diethylaminopropyl) acrylamide, 2-(diethylaminopropyl)methacrylamide, 2-(methacryloylaminoethyl)trimethylammonium chloride, and 3-(methacryloylaminopropyl)trimethylammonium chloride; or monomers, which lead to hydrophobic interaction in chromatographic separation.

In addition to this, functional groups from monomers like acrylic acid, glycidyl methacrylate, vinyl azlactone can be further functionalized with amines containing hydrophobic groups such as an alkylamine with 6 to 18 carbon atoms, benzylamine, phenyethylamine, phenoxylethylamine, flurobenzylamine, aniline or methoxylbenzylamine.

Effect of Polymerization Time

The dependence on polymerization time of this system is examined by stopping the reaction after 6 h, 18 h, and 22 h. The results for respective measurements for $Q_S$ and $LD_{BCA}$ are shown in FIG. 7 referring to Ligand density and static capacity for different polymerization durations.

The performance constancy of grafted CPG in the range of 6 h and 22 h polymerization duration proves the completeness of reaction after 6 h at 40° C.

Effect of Polymerization Temperature

The influence of polymerization temperature is examined by experiments carried out with two different acrylic acid concentrations at 40° C., 50° C., and 60° C. The respective values for $LD_{BCA}$ and $Q_S$ are plotted in FIGS. 8a) and b).

The increase of polymerization temperature up to 60° C. results in slightly higher values for ligand density and static capacity, for both, lower and higher acrylic acid concentration.

With regard to the results in FIG. 8a), slightly advantage of polymerization at 50° C. for acrylic acid grafting on TMTGE coated CPG is noticeable.

Effect of Initiator Concentration

The influence of cerium ammonium nitrate concentration on graft polymerization of acrylic acid for protein A immobilization is examined with high and low acrylic acid concentration, and two different EDC concentrations (EDC=acronyms for 1-ethyl-3-(3-dimethylaminopropyl) carbodiimide; protein A coupling agent). The findings are depicted in FIGS. 9a) and b).

FIG. 9 shows that for the two series with two different EDC concentrations, static capacity and ligand density have reached a maximum value at certain CAN concentration (0.03 mol/L). Further increasing or decreasing of CAN concentration causes lower values for immobilized protein A. Moreover, the reaction is more sensitive to the changes in initiator concentration with high acrylic acid concentration, as compared to the changes at low acrylic acid concentration. With 0.005M CAN, attempts with high acrylic acid concentration show lower values for $LD_{BCA}$ and $Q_S$ than attempts with low acrylic acid concentration. This is attributable to protein A coupling conditions.

Concentration of cerium ammonium nitrate is responsible for the amount of free radicals (predominantly at the hydroxyl group providing surface), created due to the redox reaction, described above. Radicals propagate via reaction with the vinyl bonds in the propagation step to form polymer grafts, such that grafting yield increases with the amount of released radicals. However, for CAN concentrations higher than optimum, termination reactions become more significant. Additionally, the formation of homopolymer in solution increases with CAN concentration. Homopolymerization and grafting polymerization are competing reactions.

Effect of Monomer Concentration

The influence of acrylic acid concentration on graft polymerization and the capability of PrA immobilization are investigated in the range from 0.09M to 0.85M acrylic acid, while keeping all remaining variables constant. Monomer concentration was found to be the most sensitive parameter of all the examined polymerization variables. Therefore, the carbon content of obtained beads was determined by elemental analysis additionally to ligand density and static capacity. Thus, further grafting evidence, independent from protein A coupling is available. The results are presented in FIG. 10.

Data in FIG. 10 show an increase of grafted polymer with increasing acrylic acid concentration up to 0.63M. Further concentrating of monomer leads to smaller amount of poly (acrylic acid) on coated CPG surface.

To find the correlation of polymerization, PrA immobilization and capability of IgG capturing ligand density and static capacity are plotted against monomer concentration in FIG. 11.

With regard to the trend of values for ligand density and static capacity, shown in FIG. 11, higher grafting yield results in higher protein A immobilization, and consequently in higher static capacity to a certain limiting monomer concentration. Therefore, if more polymer is grafted on the surface a higher amount of functional groups is available and subsequently more protein molecules are able to bind on the tentacles. But it is found, that increasing acrylic acid concentration beyond a certain limit (i.e. at [AA]>0.35M) does not necessarily result in further increase of static binding capacity. Additionally, attempts with acrylic acid concentrations beyond 0.3M are tending to significant variation in the measurement results.

Immobilization and Efficiency of Protein A

To gain a better understanding for the immobilization of protein A on poly(acrylic acid) tentacles and its effect on chromatographic performance, it needs to be ensured that lack of reproducibility in the above mentioned processing steps (TMTGE coating and polymerization) is not responsible for variations in the measurement results. Therefore, a scale up of graft polymerization step is conducted. By doing so, a batch of pAA grafted CPG can be split for the investigation of protein A coupling conditions. The influence of EDC concentration and protein A amount on protein immobilization to particles with different quantity of grafted pAA is investigated.

Effect of EDC Concentration on Protein A Immobilization

EDC is used for carboxylic acid groups' activation to form peptide bounds with amine groups of protein A. Since the coupling was performed with the same concentration for EDC and protein A, the ratio of EDC and protein A to carboxylic acid groups is changed with the significant increase of grafted pAA amount. Therefore, a set of experiments for coupling with varied EDC concentration and two different protein A amounts (15 mg and 30 mg of protein A per mL of resin) is set up and performed, using the same batch of grafted CPG. Results for this set of experiments are plotted in FIGS. 12a) and b).

Table 2 shows results for $Q_S$ and $LD_{BCA}$ for varied EDC concentration with two different amounts of protein A loading. As shown in FIG. 12B, $LD_{BCA}$ increases continuously with increasing amount of EDC in solution until 0.025 g/10 mL. However, further increase of EDC content leads to a plateau of detected protein A as a function of EDC concentration. In contrast, as shown in FIG. 12A, the static binding capacity is observed to exhibit a maximum at EDC concentration of 0.025 g per 10 mL of solution. Coupling attempts with significant longer reaction time (20 h instead of 2.5 h) confirm this trend and, thus, eliminate the influence of coupling time.

According to the results in FIG. 12, EDC concentration affects protein A coupling very sensitively, with respect of maximum achievable static binding capacity and ligand density. The parallel increase of both values, for $Q_S$ and $LD_{BCA}$, until a certain EDC concentration is expected because EDC promotes the coupling reaction and more attached protein A is expected to capture more IgG.

The plateau observed in $LD_{BCA}$ as a function of EDC concentration might be attributable to two limitations in the current system. Firstly, the limited amount of provided protein A can simply limit the maximum achievable ligand density, considering that a higher protein A amount leads to a slightly higher level plateau. Secondly, every protein A molecule occupies a certain segment of polymer tentacles. The exhaustion of all accessible carboxylic acid groups might be responsible for the plateau at the examined grafting quantity.

The maximum of static binding capacity as a function of EDC concentration might be attributable to several phenomena occurring during the immobilization reaction. For a better overview of the present dimensions, the ratios of EDC to carboxylic acid groups and to protein A, such as they were used are listed in Table 2.

TABLE 2

Ratio of EDC to carboxylic acid groups and to protein A, used in the EDC study above. Calculations are based on carbon content measurement (0.16 mmol AA per 5 mL resin), and an average molecular weight for protein A of 50 kDalton.

| EDC | | Ratio of EDC to carboxylic acid groups | | Ratio of |
|---|---|---|---|---|
| [g/10 mL] | [mmol/10 mL] | for 10 mL solution | for 5 mL solution | EDC to protein A |
| 0.2 | 1.043 | 6.42 | 3.21 | 347.77 |
| 0.1 | 0.522 | 3.21 | 1.61 | 173.88 |
| 0.05 | 0.261 | 1.61 | 0.80 | 86.94 |
| 0.025 | 0.130 | 0.80 | 0.40 | 43.47 |
| 0.01 | 0.052 | 0.32 | 0.16 | 17.39 |
| 0.005 | 0.026 | 0.16 | 0.08 | 8.69 |
| 0.0025 | 0.013 | 0.08 | 0.04 | 4.35 |

Table 2 shows that based on carboxylic acid groups, there is a shift in the used EDC concentration from an excess to a shortage, right in the range of the maximum of static binding capacity (0.025-0.05 g/10 mL). Whereas even the lowest EDC concentration constitutes an excess as compared protein A molecules. However, EDC can also be irreversible consumed by the hydrolysis reaction as shown in the following scheme which shows EDC mediated activation of carboxylic acid groups for the creation of peptide bounds, including hydrolysis as a side reaction:

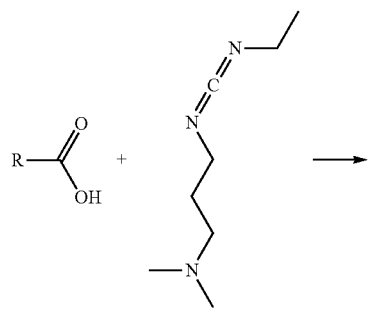

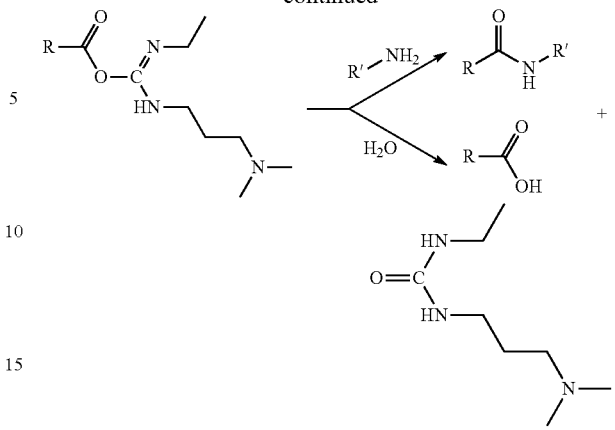

This means, that a small excess of EDC to protein A, such as in the attempts with 0.005 and 0.0025 g/10 mL, is not sufficient to immobilize all available protein A molecules. A significant amount of EDC is consumed due to the hydrolysis with water and, thus, not available for protein coupling anymore.

Static binding capacity reaches a maximum at the point where the plateau of ligand density begins and the binding capability decreases drastically with further EDC increase.

A high excess of EDC might be responsible for changes of the active sites of protein A. In this case, carboxylic acid groups of proteins may be activated, and may lead to dimerization or cross linking of protein molecules and, thus, to a limited capability for IgG capturing.

Also, EDC is applied as a hydrochloric so that varied EDC concentration leads to a change in pH and in the salt concentration of the coupling solution. These shifts might be responsible for changes in the chain conformation. Poly (acrylic acid) is a weak poly electrolyte and shows stretched chains under alkaline conditions. High salt concentration and decrease of the pH usually support the coil conformation. Compared to stretched chains, the coil might lead to unfavorable positioning of the immobilized protein A.

Furthermore, high EDC concentration increases the number of simultaneously activated functional groups and, therefore, it is responsible for a very fast immobilization of protein molecules. Assumed that polymer chains exist as a coil with entanglements, fast multiple point attachment at random spots along the polymer chains also lead to unfavorable positioning of protein A so that its IgG capturing capability is inhibited.

Efficiency of immobilized protein A in regard to IgG capture ability in this EDC study is depicted in FIG. 13. FIG. 13 shows the efficiency of IgG capturing of immobilized protein A dependent on EDC concentration. Calculations are based on molecular weights for protein A of 50 kD and for IgG of 144 kD. In special it shows how many IgG molecules are caught by one protein A molecule at different EDC concentrations. The efficiency of immobilized protein A decreases constantly with the increase of applied EDC.

Still in mind that common protein A possesses five active sites for IgG attachment, the hypothesis that EDC changes the active sites of protein A or is responsible for its lack of accessibility, is emphasized by this plot.

Correlation between graft quantity, ligand density and static binding capacity:

After EDC concentration is identified as a very sensitive influencing parameter in the protein coupling step for chromatographic performance of grafted CPG, a reduced EDC study is accomplished by varying acrylic acid concentration and protein A amounts. The results are plotted in FIGS. 14 and 15.

FIGS. 14a) and b) show dependencies of $LD_{BCA}$ (A) and $Q_S$ (B) on acrylic acid concentration and different EDC concentrations with high protein amount (30 mg protein A per 1 mL of resin).

FIGS. 15a) and b) show dependencies of $D_{BCA}$ (A) and $Q_S$ (B) on acrylic acid concentration and different EDC concentrations with low protein amount (15 mg protein A per 1 mL of resin).

FIG. 14 and FIG. 15 show an increase of ligand density with increase in the acrylic acid concentration. From 0.65M acrylic acid, the values for detected protein stay constant at approximately 11 mg/mL for the low protein loading (15 mg of protein A per mL of resin), and at ~20 mg/mL for the application of high protein quantity (30 mg of protein A per mL of resin). At the same time, the very low EDC concentrations of 0.0025 and 0.005 g/10 mL lead to significant lower protein immobilization, using the same pAA grafted particles.

While the effects of acrylic acid and EDC concentration on ligand density are straightforward, the static binding capacity varies in more complicated fashion. The static capacity increases with increase in [AA] and ligand density only to [AA]=0.425M. For [AA] higher than 0.425M, static capacity decreases despite of increase in ligand density suggesting that there is an optimum around [AA] of 0.425M. Under the best coupling conditions, values of ~60 mg/mL for $Q_S$ are achievable at [AA]=0.425M. The increase of acrylic acid concentration beyond 0.425M resulted in a drastically loss of static binding capacity. Whereas in the range of 0.65M to 0.85M, resins with less immobilized PrA (lower $LD_{BCA}$) are capable to capture more IgG than such with higher ligand density. This correlation is valid for slightly changes in $LD_{BCA}$ caused by EDC concentration, but more clearly for the obvious difference between the application of high protein amount (FIG. 14) and low protein amount (FIG. 15).

The plot of ligand density versus static binding capacity for different monomer concentration obtained in the current study is shown in FIG. 16. This Figure shows the static binding capacity versus ligand density for the acrylic acid concentrations of 0.21M, 0.425M, 0.65M, and 0.85M.

FIG. 16 illustrates that high grafting quantity (related to acrylic acid concentration) results in high achievable $LD_{BCA}$. The polymerization with acrylic acid concentration above 0.425M, however, leads to a decrease of $Q_S$ while quantity of immobilized protein A increases.

These results are indicating that the addition of too much protein A to CPG particles with high quantity of grafted pAA is responsible for either, pore clogging or for a hindered mass transfer for IgG into the pore system. Such a pore clogging or hindered mass transfer of IgG inside the pores is further confirmed by $Q_S$ values below non specific binding capacity of pure CPG (15 mg/mL) for high $LD_{BCA}$.

Table 3 gives a final overview about the dimension of grafted pAA and immobilized PrA for the specification of used CPG particles, calculated with the aid of carbon content and BCA assay measurements.

TABLE 3

Dimensions of obtained graft polymer and immobilized protein A on CPG.

| Acrylic acid [mol/L] | Carbon content [%] | Grafted AA [µmol/mL] | Highest $LD_{BCA}$ [µmol/mL] | Ratio AA/protein A |
|---|---|---|---|---|
| 0.21 | 0.256 | 23.7 | 0.15 | 158 |
| 0.425 | 0.351 | 32.5 | 0.22 | 148 |
| 0.65 | 0.72 | 66.7 | 0.42 | 159 |
| 0.85 | 0.55 | 50.9 | 0.41 | 123 |

Based on data shown in Table 3, approximately 150 repetitive units are necessary in average per protein A molecule for an exhaustive protein A immobilization on poly(acrylic acid) tentacles.

Overall, in case of particles with a mean pore size of 1065 Å, it is observed that the optimum of acrylic acid concentration to yield the maximum $Q_S$ of 63 mg/mL is 0.425M. Increasing [AA] beyond the optimum results in higher ligand density, but lower static binding capacity. Such correlation between acrylic acid concentration (and therefore, grafting yield), ligand density and static capacity is observed due to pore clogging and limited access of PrA molecules for target IgG molecules.

Transfer of Ce(IV) Initiated pAA Grafting to CPG with Smaller Pore Size

In this section, the transfer of Ce(IV)-mediated polymerization of AA to smaller pore sized particles (from CPG1000 to CPG800) is discussed on the basis of conducted experiments. As described earlier CPG1000 and CPG800 differ in their important attributes. CPG800 possesses pores with a mean diameter of 859 Å and a surface area of 46.4 m$^2$/mL (CPG1000: 1065 Å, 26.6 m$^2$/mL). The particles size and size distribution is the same.

The results for the investigation of Ce(IV) initiated pAA grafting on CPG with smaller pore size are plotted in FIGS. 17a) and b) which show the dependencies of ligand density (A) and static binding capacity (B) dependent on acrylic acid concentration on small pore sized CPG with different EDC concentration, and 15 mg protein A per 1 mL of resin.

FIG. 17a) shows that under investigated coupling conditions, the achievable $LD_{BCA}$ increases from 9.0 g/mL to 12.2 mg/mL from 0.1M to 0.2M acrylic acid. With 0.425M acrylic acid, the highest detected $LD_{BCA}$ is 10.6 mg/mL. Furthermore, the ligand density is stronger influenced by EDC concentration at low AA concentration. More EDC leads clearly to higher ligand density with 0.1M acrylic acid.

The trend of detected static binding capacity for this study is shown in FIG. 17b). Achievable $Q_S$ is at 0.2M acrylic acid with 60.5 mg/mL higher than with 0.1 M (up to 45.0 mg/mL), and 0.425M (up to 51.6 mg/mL). The influence of EDC concentration on $Q_S$ is opposed to its influence on $LD_{BCA}$. The role of EDC concentration in the examined range is clearly depicted in FIGS. 18a) and b). FIGS. 18a) and b) show ligand density (A) and static binding capacity (B) at varied EDC and acrylic acid concentration. FIG. 18a) shows clearly that $LD_{BCA}$ increases with applied EDC concentration at 0.1 M acrylic acid, while there is no conclusive trend for higher AA concentration. In FIG. 18b) is shown that $Q_S$ for 0.1M and 0.2M acrylic acid decreases constantly with increasing EDC concentration. At 0.425M acrylic acid the influence of EDC concentration on resulting $Q_S$ is negligible.

Compared with 1065 Å pores (CPG1000), the grafting of AA via Ce(IV) initiation on CPG with 859 Å mean pore size (CPG800) results in best chromatographic performance with different coupling conditions as well as polymerization conditions.

Since the CPG800 provides a significant higher surface area than CPG1000, more grafted pAA chains per mL resin are expected to be needed under the same polymerization conditions. This assumption means that less repetitive units per polymer chain can provide the same amount of functional groups. Therefore, it is reasonable that the same ligand density and static binding capacity for CPG800 and CPG1000 is reached at different AA concentration:

CPG800: QS~60 mg/mL, BCA~11 mg/mL at 0.2M acrylic acid
CPG1000: QS~59 mg/mL, BCA~10 mg/mL at 0.425M acrylic acid Furthermore, the transfer to different pore size, surface area and, thus, changed arrangement of grafted polymer, results in different optimum polymerization conditions with respect to [AA] and coupling conditions with respect to [EDC]. As described earlier, this shift is a consequence of smaller pore size and increased surface area of CPG800 as compared to CPG1000. The different optimum for CPG800 also highlights the complicated nature of the porous system with grafted polymers used as chromatography medium as compared to non-porous, low area substrates.

SI AGET ATRP

A further object of the present invention is the applicability of surface initiated AGET ATRP to activate the surfaces of porous metal oxide particles for the usage in protein A chromatography. In Ce(IV) initiated graft polymerization potential influencing parameter for graft polymer attributes are varied and the effect of these variables on PrA immobilization ability is determined by static binding capacity and ligand density measurement in order to find out whether SI AGET ATRP can be applied to a porous system to synthesize a material for use as an affinity chromatography medium.

For this GMA is chosen as a monomer, and the grafted polymer can be directly coupled using protein A. In contrast, acrylic acid is a weekly acidic monomer and can hinder the process of ATRP.

Effect of Initiator Immobilization

As described previously, the model of SI AGET ATRP requires that the initiator is immobilized on the surface of the support material before polymerization step. The amount of immobilized initiator molecules is determinative for the number of growing chains and, thus, the graft density. Varying the amount of attached initiator is attempted by varying the concentration of initiator molecules during the immobilization step.

Unfortunately, the initiator immobilization step does not allow accurate reproducible results. While polymer grafting under same conditions from the same immobilization batch results in comparable values for $Q_S$ and $LD_{BCA}$, these values show significant batch-to-batch variations. The initiator grafted CPG is also tested for bromine content.

The bromine content, determined by elemental analysis, amounts to 533 ppm for TMTGE coated CPG, which corresponds to one initiator molecule per 6.6 nm² and consequently to 2.9 nm as the average distance between two initiator molecules. Identical Bib immobilization conditions result in 137 ppm of bromine on the surface of uncoated CPG. The average distance between two initiator molecules amounts here to 5.7 nm.

Effect of Polymerization Conditions

Since polymer chains obtained from an ideal SI AGET ATRP are all the same length, and since the graft density is fixed by initiator immobilization, theoretically, only the grafted layer thickness or the brush length is variable. Therefore, the most challenging part consists in the creation of a reaction system which allows a working SI AGET ATRP.

The solvent for the polymerization needs to meet the following attributes: 1) all components—catalyst, ligand, monomer, and at least partially the reducing agent—need to be soluble. 2) The solvent should be miscible with water, considering the subsequently treatment in aqueous environment; non polar, organic solvents would hamper pore accessibility.

Under these aspects, dimethylformamide and tetrahydrofuran are appropriate solvents. Ascorbic acid, $CuBr_2$, GMA, and Bpy are sufficiently soluble in DMF. In THF, only small quantities of $CuBr_2$ are soluble with the aid of PMDETA as ligand. Ascorbic acid is only partially soluble in THF.

Polymerization, conducted in both solvents, resulted in decent values for ligand density, and static binding capacity. But since attempts in THF, contrary to those in DMF, did not show significant changes by wide variations of monomer concentration, and since the solubility issues with THF are limiting the range of variations, further polymerization is performed in DMF.

Increasing monomer concentration was the obvious and easy choice of variables to test first. To investigate effects of [GMA], pGMA grafted CPG was titrated to determine the epoxy content. The results are plotted in FIG. 19. FIG. 19 shows the determined number of epoxy groups by titration on pGMA grafted CPG via SI AGET ATRP with varied GMA concentration. This figure shows an approximately linear increase of epoxy groups on CPG surface with increase of GMA concentration.

Furthermore, the epoxy quantity of >300 μmol/mL proves the multiplication of functional groups compared to conventional preparation of protein A chromatography material, approached with "small molecule coupling". In comparison to this, it is known that CPG provides approximately 50 μmol hydroxyl groups per mL of resin.

This means that in Ce(IV) mediated polymerization, the total grafting amount presents one of the most sensitive variables to affect PrA immobilization ability, and presumably, the static binding capacity. Typical variables for current SI AGET ATRP are the polymerization time, catalyst concentration, temperature, and monomer concentration. But since changes in pGMA graft quantity at varied GMA concentration is found by epoxy titration, an effect of GMA concentration on achievable ligand density and static binding capacity is most obvious. The results are depicted in FIGS. 20a) and b) show the influence of GMA concentration on static binding capacity (A) and ligand density (B) on CPG, grafted via SI AGET ATRP. In detail FIG. 20 shows $Q_S$ and $LD_{BCA}$ for the range of 0.03M to 0.55M GMA. While, it is observed that the ligand density does not change significantly (4-6 mg/mL for the range of [GMA] tested), $Q_S$ continuously decreases with the increase in GMA concentration. The static binding capacity decreases from 30.5 mg/mL at [GMA]=0.03M to 12.8 mg/mL at [GMA]=0.55M.

These results are contrary to the findings for the protein A immobilization on poly(acrylic acid) grafted CPG, obtained by Ce(IV) polymerization, where the addition of grafted pAA leads to an increase of protein A immobilization ability as measured by $LD_{BCA}$, and up to a certain point also to an increase of static binding capacity. The quantity of grafted pGMA shows a negligible effect on the ligand density. In contrast, higher values were observed for the resins with fewer epoxy groups on the surface. For the static binding capacity, the highest value was detected at a point, where, calculated on base of bromine determination and epoxy titration, only oligomers with averagely up to thirteen repetitive units were generated.

Thus a multiplication of functional groups on the particle surface via SI AGET ATRP of GMA is proved. However, in view of the fact that the increase in epoxy groups results in unchanged ligand density and even in decreasing static binding capacity. But this is not sufficient a conclusions about coupling conditions.

Effect of Coupling Conditions on Chromatographic Performance

In regard to the circumstances for protein A immobilization on pGMA grafted CPG obtained via SI AGET ATRP, there are three main differences compared with pAA grafted CPG via Ce(IV) polymerization:

1) While the protein coupling via pAA is shaped by the influence of EDC, pGMA provides immediately reactive epoxy group with every repetitive unit, which may lead to unfavorable positioning of protein A.
2) pGMA is insoluble in water. Grafted chains are shrunk on the surface, or at least not dilated as in the case of pAA. Most of the epoxy groups are not reachable for protein A macromolecules
3) Achievable graft density is usually higher with SI ATRP than with Ce(IV) graft polymerization.

To compensate these inequalities, some attempts of improved coupling conditions have been done. Ethanol and isopropanol were added to make the coupling protein A solution slightly more hydrophobic. Better solvents for pGMA, such as, THF or dioxane, have not been applied because rough changes in the environment can lead to deactivation of protein A. Furthermore, a totally different route for protein A coupling, whereby epoxy groups are converted into aldehyde, suitable for reductive amination with protein A in aqueous solution (see the following scheme) is conducted. The more hydrophilic intermediates of the grafted polymer chain might lead to better accessibility for protein A. Respective results are listed in Table 4.

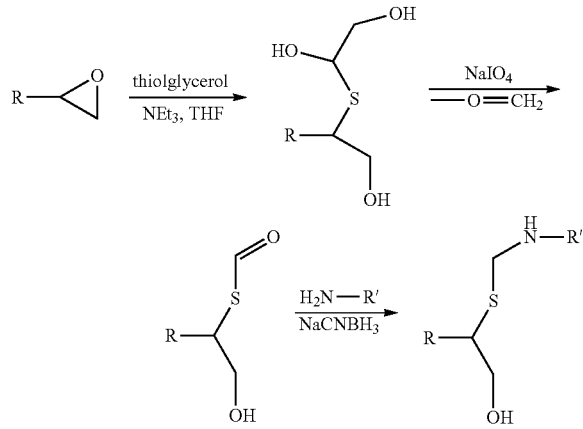

This scheme shows an alternative "reductive amination" route for protein A coupling started from epoxy group [H. Ahmed, Principles and Reactions of Protein Extraction, Purification, and Characterization, CRC Press LLC, 2004].

TABLE 4

Results for static binding capacity and ligand denisty obtained by different protein coupling conditions on the same batch of pGMA grafted CPG.

| Coupling conditions | Static binding capacity [mg/mL] | Ligand density [mg/mL] |
| --- | --- | --- |
| Conventional | 24.5 | 5.91 |
| Isopropanol | 25.2 | 3.39 |
| Ethanol | 29.8 | 4.55 |
| NaSO$_4$ | 29.8 | 10.53 |
| Reductive amination | 25.4 | 5.43 |

Table 4 shows only slight changes for static binding capacity for the applied protein coupling conditions. Protein A coupling in 50% ethanol and in the presence of 1.1M sodium sulfate result in the highest values for $Q_S$ with 29.8 mg/mL. With 10.5 mg/mL the $LD_{BCA}$ is significantly higher using sodium sulfate than with the conventional coupling procedure.

Based on these results, the inner of grafted pGMA coils or brushes is obviously not or only partially accessible for protein A during the coupling reaction, unless a significant higher salt concentration forces the protein molecules into the polymer. But even then, protein A is not efficiently accessible for IgG capturing.

Transfer to ZrO$_2$ System

As already described earlier the primary object of the present invention is to provide alkaline resistant porous ceramic particles for protein A chromatography application. As it is known that ZrO$_2$-particles are stable in view of caustic attack the concept disclosed here for derivatisation of CPG is also tested for porous ZrO$_2$ particles although it is known, that ZrO$_2$ is less reactive and possesses hardly any hydroxyl groups.

Since, up to this point, Ce(IV) initiated graft polymerization of acrylic acid results in the best chromatographic performance, this technique is applied on zirconia coated CPG as a prove of principle. Again, pore size, pore size distribution, and particle size are important attributes in the current purpose of comparing glass surface with zirconia surface. For this reason, CPG of the same type (CPG1000) as used in the former study is coated with a thin layer of ZrO$_2$. Characterization of coated particles is presented in FIG. 21. Morphological attributes are not significantly affected by zirconia coating.

Because of less usable surface hydroxyl groups on zirconia surfaces, even for the same morphology as for CPG, it is not expected that identical conditions for surface activation and polymerization will result in the same chromatographic performance. However, in a fashion similar to the CPG1000, effect of [AA] was investigated with the ZrO$_2$ coated CPG. Results for ligand density and static binding capacity are plotted in FIGS. 22a) and b). These Figures show the influence of acrylic acid concentration on ligand density (A) and static binding capacity (B) of zirconia coated CPG. EDC: 0.025 g/10 mL, protein A: 30 mg/mL resin.

FIG. 22 shows the influence of acrylic acid concentration on ligand density and static binding capacity of Ce(IV) initiated polymerization on zirconia coated CPG. $LD_{BCA}$ is increasing with acrylic acid concentration until it reaches a plateau level at 15 mg/mL. The plot of static binding capacity shows a maximum in $Q_S$ of 51.3 mg/mL at 0.17M AA. From this point, $Q_S$ rapidly decreases as [AA] increases. This optimum [AA] is lower as compared to both CPG1000 and CPG800.

Apart from the absolute values of optimum monomer concentration, these two plots show a similar trend as shown in case of CPG of both the sized studied. Although the highest $Q_S$ values do not reach those of CPG1000, the above results prove, in principle, that the process of TMTGE coating followed by pAA grafting and protein A immobilization can be successfully transferred to an appropriate $ZrO_2$ based porous system for the synthesis of caustic stable protein A affinity medium.

| resin | max. $Q_S$ [mg/mL] | max. $LD_{BCA}$ [mg/mL] |
|---|---|---|
| CPG1000 | 63.2 | 21.1 |
| Zirconia coated CPG | 51.3 | 15.1 |

Since for the transfer from pure CPG to zirconia coated CPG was conducted with only one fixed EDC concentration, optimization of coupling conditions is possible.

In summary, the transfer of Ce(IV) initiated graft polymerization of AA from glass to ceramic surface succeeded. Unexpectedly the achieved static binding capacity for the allegedly alkaline resistant ceramic resin is even higher than the commercial CPG resin with same morphology, activated with small molecules (ProSepHC).

Dynamic Binding Capacity of Obtained Resins

While $Q_S$ generally presents the maximum capacity of the synthesized resin, performance of the resin in a practical mode of operation is measured as dynamic binding capacity. Such a measurement is performed by packing the resin in a column, and testing it with a typical run with buffers of different pHs. The shape of curve obtained in DBC experimental run also provides some information about mass transfer properties of the pore system under consideration. For the resins obtained in the current work, the DBC was determined for CPG1000 activated by ATRP and Ce(IV) mediated pAA grafting, in addition to CPG800, and zirconia coated CPG1000, grafted with pAA via Ce(IV) initiation. Additionally, the DBC of commercial available ProSepHC was determined as a well known standard. The curves of respective DBC measurements are plotted in FIG. 23. Values for the DBC at 10% break through ($DBC_{10\%}$) and at 50% break through ($DBC_{50\%}$) are provided in Table 3.

TABLE 3

$DBC_{10\%}$, $DBC_{50\%}$, and $Q_S$ for exemplary resins, obtained from activation techniques used in the current study and the commercial available ProSepHC as a standard.

| resin | $DBC_{10\%}$ [mg/mL] (run #1-#5) | $DBC_{50\%}$ [mg/mL] (run #1-#5) | $Q_S$ [mg/mL] |
|---|---|---|---|
| ATRP | 19.1-18.2 | 27.1-25.9 | 30.5 |
| Ce(IV) on CPG1000 | 39.1-28.4 | 56.9-45.5 | 63.2 |
| Ce(IV) in CPG800 | 22.6-16.7 | 42.2-33.1 | 51.6 |
| Zirconia coated CPG | 28.3-29.1 | 50.7-48.5 | 51.3 |
| ProSepHC | 25.3-26.1 | 38.3-39.6 | 35.0 |

FIG. 23 shows the course of curves for tested protein A resins. After switching from bypass to column-loading-mode, the duration of optimal column loading is reflected by the length of arising plateau until significant amount of IgG from the feed breaks through the column and, thus, the UV absorption accumulates. The general rule is, the longer the plateau, the higher the dynamic binding capacity. The slope of the curve after the plateau shows how much IgG is captured afterwards, and affects mainly the DBC for high IgG break through.

First look at the plot for different resins shows the difference between all the resins, and that ProSepHC and resins prepared by the Ce(IV) initiated pAA grafting have different mass transfer properties. While ProSepHC shows a sharp breakthrough, the resins made by Ce(IV)-mediated polymerization exhibit a rather prolonged breakthrough suggesting that change in the pore system. The shape of curve for the resin obtained by ATRP treatment is comparable to the result for ProSepHC. Only the shorter loading-plateau reflects the expected lower DBC for ATRP treated resin.

The peaks for Ce(IV) grafted resins are significantly less sharp, and the slope after the plateau is clearly flatter. This phenomenon is attributable to a hindered mass transfer. IgG still binds to immobilized protein A caused by diffusion, while a major amount of IgG molecules already passes through the column because easy accessible protein A is already occupied. Usually the $DBC_{50\%}$ reaches approximately the value of $Q_S$, and the values are reflected in the length of the plateau. In the case of grafted CPG800, an unexpected short plateau leads to significant lower $DBC_{50\%}$ than the $Q_S$ indicates. On the other hand is the curve for this resin the flattest, which means that the column is still loading long time after the initial break through point.

Unexpected in the DBC values, presented in Table 3, is the high variation between first and fifth run, especially for the resins which are prepared from pure CPG. The variation process is depicted in FIG. 24.

According the results in FIG. 24, resins obtained from pAA grafting via Ce(IV) initiation on pure CPG are not stable during the first five runs of DBC measurement. In contrast, ATRP treated CPG and pAA grafted CPG with a zirconia surface, as well as small molecule activated CPG (ProSepHC) are stable during the conducted measurements.

To prevent reduced binding capacity caused by slow mass transfer, the reduction of the flow rate is an appropriate tool. The difference in loading behavior for changed residence time for tested resins is illustrated in FIG. 25. The changes for $DBC_{10\%}$ values from 3 min to 9 min residence time are listed in Table 6.

FIG. 25 shows comparisons of column loading behavior with 3 min and 9 min residence time, for ProSepHC (a), ATRP treated CPG (b), CPG1000 with pAA tentacles (c), and $ZrO_2$ coated CPG with pAA tentacles (d).

TABLE 6

Comparison of results for $DBC_{10\%}$ with residence time of 3 min and 9 min for different resins.

| | $DBC_{10\%}$ [mg/mL] | |
|---|---|---|
| resin | 3 min | 9 min |
| Ce(IV), CPG1000 | 28.4 | 42.4 |
| Ce(IV), $ZrO_2$ | 29.1 | 40.9 |
| ATRP | 18.2 | 17.3 |
| ProSepHC | 26.1 | 28.3 |

FIG. 25a) and FIG. 25b) are showing an only slightly varying course of curve at changed residence time for ProSepHC (a) and the ATRP treated resin (b). The variation is mainly attributed to the slightly lower IgG feed concentration (see bypass peak). The almost consistent values for $DBC_{10\%}$ in Table 6 confirm the absence of residence time influence on these two resins.

In contrast, the curves in FIG. 25c) and in FIG. 25d) are showing a significant longer plateau with longer residence time before IgG breaks through. This observation is reflected in the respective values for $DBC_{10\%}$, listed in Table 6.

In summary, the current DBC study indicates that surface activation of CPG via SI AGET ATRP of pGMA leads to protein immobilization, limited to the surface area, comparable to surface activation with small molecules. This fact leads to unhindered mass transfer in the DBC measurement and, thus, a sharp signal. In contrast, the high achievable static binding capacity of CPG, activated with Ce(IV) initiated grafting of pAA is accompanied by hindered mass transfer for IgG capturing, as has been proven in the current DBC study. This difference between ProSepHC and polymer grafted CPG suggests differences in the mass transfer properties of the two resins: due to the uniform pore structure of ProSepHC, there is no significant difference between the DBC measured at high and low residence time as compared to polymer grafted CPG, which shows significant difference at two different residence times.

The special advantage of the present invention is the multiplication of functional groups available at the surface of porous ceramic based particles, started from initial available hydroxyl groups. Cerium(IV)salt initiated polymerization and SI AGET ATRP. The use of acrylic acid and glycidyl methacrylate as monomer provides appropriate functional groups for subsequent protein immobilization.

Both polymerization techniques disclosed here meet the requirements of functional group multiplication. SI AGET ATRP even allows facile control over the amount of epoxy groups via graft polymerization as shown in its linear dependence on monomer concentration.

But for the use of grafted particles, more important than the actual generation of grafted polymer chains on the surface is their usability for PrA immobilization and the accessibility of protein A ligands for the attachment of IgG molecules.

The suitability of disclosed polymerization techniques for the activation of support particles for protein A chromatography differs significantly—at least for the applied monomers and in the range of varied process conditions.

Ce(IV) initiated grafting of pAA, followed by PrA coupling with the aid of a carbodiimide (EDC) as coupling agent, leads to high available ligand density and static binding capacity. According the initial idea of functional group multiplication, until a certain point, achievable $LD_{BCA}$ and $Q_S$ are proportional to the amount of grafted polymer. From this point $LD_{BCA}$ is stagnating and $Q_S$ even decreases. This phenomenon is attributed to the limited available space in the pores. Independent from quantity of grafted pAA, ligand density and resulting static binding capacity are sensitively influenced by coupling conditions, especially the EDC concentration.

The graft polymerization of GMA via SI AGET ATRP leads to reasonable amounts of reactive epoxy groups (as shown by the titration results), increasing with the polymer chain growth.

Thus, according to the present invention two different grafting-from polymerization techniques are carried out on controlled pore glass with an aliphatic coating which provides required hydroxyl groups.

Both techniques, SI AGET ATRP of glycidyl methacrylate and cerium(IV) salt initiated graft polymerization with acrylic acid as monomer, allow the subsequent protein A immobilization for protein A chromatographic application.

Basically, more grafted pAA allows the immobilization of more protein A. The increase of resulting capability for IgG capturing, however, is limited and pore clogging has to be avoided. In the range of parameter variation, acrylic acid concentration is identified as the main influencing parameter for grafting quantity. The ligand density and static binding capacity is also strongly affected by the EDC concentration in the coupling process. Compared to these influences, parameters such as polymerization temperature, polymerization time (after 6 h) and initiator concentration don't have significant impact.

For grafting of pGMA on CPG via SI AGET ATRP, the chain growth was monitored by epoxy titration of resulting materials. The amount of available epoxy groups increases linearly with the applied monomer concentration. While ligand density stays similar over a broad range of monomer concentration, the static binding capacity even decreases with the increase in epoxy groups. Notably, the level of achievable chromatographic performance is lower compared with grafted CPG with pAA via Ce(IV) initiation.

The way of protein coupling is affected by the polymer chain conformation as well as the number of simultaneously activated handles. While the chain conformation is primarily determined by the chemical environment during coupling process (solvent, pH, salt concentration), the number of activated handles in pGMA is predetermined because every repetitive unit provides one epoxy group. For pAA the EDC concentration is determining.

Experiments have shown that pGMA tentacles are shrunk on the surface in aqueous solution so that only the surface of the grafted layer is available for the reaction with amine groups of protein A. pAA chains, in contrast, are stretched due to their high solubility in water and their poly electrolytic character, which leads to a high accessibility of all polymer segments in the vertical. Too many simultaneously activated functional groups obviously induce cross-linking between polymer chains, caused by multiple point attachment of protein A and consequently to less accessibility of immobilized protein A molecules for IgG.

With the surface activation via Ce(IV) initiated graft polymerization of acrylic acid, a way for the generation of very efficient protein A chromatographic material has been found. The achievable static binding capacity of 63 mg IgG per mL resin is much higher compared to 35 mg/mL for the commercial product with same support material (ProSepHC) which is modified by conventional "small molecule" activation.

Because of the robustness of the developed process, and the possibility to use aqueous solutions the disclosed procedure is more economical and ecological compared with the ATRP system.

Due to the high available static binding capacity with Ce(IV) graft polymerization, the principle is transferred to a zirconia coated CPG, which leads to alkaline resistant ceramic based particles.

Taken together, with the surface activation via Ce(IV) mediated polymerization of acrylic acid has been found a very advantageous procedure for the generation of protein A chromatography resins. The intensive investigation of the application on CPG and the transfer to different systems, done in the current work, shows that the process is especially suitable for the activation for caustic stable ceramic based support material.

The present description enables the person skilled in the art to apply and carry out the invention comprehensively. Even without further comments, it is therefore assumed that a person skilled in the art will be able to utilise the above description in the broadest scope.

If anything should be unclear, it goes without saying that the publications and patent literature cited should be referred to. These documents are correspondingly regarded as part of the disclosure content of the present description.

For better understanding and in order to illustrate the invention, examples are given below which are within the scope of protection of the present invention. These examples also serve to illustrate possible variants. Owing to the general validity of the inventive principle described, however, the examples are not suitable for reducing the scope of protection of the present application to these alone.

It furthermore goes without saying to the person skilled in the art that, both in the examples given and also in the remainder of the description, the component amounts present in the compositions always only add up to a total of 100% by weight or mol %, based on the composition as a whole, and cannot exceed this, even if higher values could arise from the percent ranges indicated. Unless indicated otherwise, % data are taken to be % by weight or mol %, with the exception of ratios, which are shown in volume data, such as, for example, eluents, for the preparation of which solvents are used as a mixture in certain volume ratios.

The temperatures given in the examples and description and in the claims are always in ° C.

EXAMPLES

General Procedures
Surface Modification
TMTGE Coating

For the general approach, 5 mL of CPG (approximately 220 μmol of surface hydroxyl groups) are measured in a 20 mL column equipped with a frit. For this purpose, the CPG is slurried in pure water and settled in the column. The column needs to be tapped before the volume is determined because tapping leads to further consolidation of the CPG and, thus, to true volume measurement. The measured CPG is transferred to a 20 mL reaction vial, along with 10 mL of 5% nitric acid, and the slurry is rotated for 2.5 h at 80° C. in a hybridizer. Subsequently, the particles are washed with water for several times, until the pH of washing water is neutral.

The TMTGE coating itself takes place in the 20 mL reaction vial, as well. To 5 mL of CPG are added 2.5 mL TMTGE (9.6 mmol) and 2.5 mL of DMF. The reaction mixture is heated up to 80° C. for 4 h. The coated particles are washed three times with DMF and three times with water. For quenching, 10 mL of a 10% thioglycerol solution in 0.2M NaHCO$_3$, containing 0.5M NaCl, are added to the particles in a reaction vial. The quenching process is conducted overnight. Next day, the CPG particles are washed five times with water and, finally, they are either used for the next reaction step directly, or, stored in 20% ethanol.

For direct grafting, the CPG is only treated with 5% nitric acid at 80° C. for 2.5 h and washed with water before reaction.

Example 1

Cerium (IV) Initiated Grafting Polymerization

Ce(IV) initiated graft polymerization proceeds generally as follows. For 5 mL of pretreated CPG (with or without TMTGE treatment), a 5 mL acrylic acid solution in water (0.18M-1.7M) and a 5 mL cerium ammonium nitrate solution in water (0.01M-0.2M) are prepared—each solution includes 0.05 mL of 65% nitric acid. After washing with water, the wet filter cake is transferred to a 20 mL reaction vial with septa. After adding both solutions, the reaction mixture is homogenized and purged with nitrogen. For polymerization, the reaction vial is rotated in a hybridizer at 40° C.-60° C. for 6 h-22 h. Subsequently, the grafted particles are exposed to an extensive washing sequence, based on a patent protocol for CAN initiated grafting polymerization on porous polymer particles.[63] The wash procedure is conducted in a 20 mL column, equipped with a frit. CPG particles are reslurried for every step. The sequence is as follows:

7× water
10× 1M sulfuric acid, containing 0.2M ascorbic acid
5× water
2×10 mM PBS solution
2× water Once residual ceric salt and free polymer is removed, obtained grafted beads are either used for protein A coupling or stored in 20% Ethanol.

Example 2

Immobilization of α-Bromo Isobutyryl Bromide (Bib) on CPG Surface

CPG particles are pretreated as described above, either only with nitric acid or coated with TMTGE. For the immobilization, 100 mL of pretreated CPG are dried at 60° C. for 96 h under vacuum in a round bottom flask to ensure that residual moisture is removed completely. The round bottom flask is purged with nitrogen and sealed with a septum. Anhydrous THF (180 mL) and triethylamine (14 mL, 100.4 mmol) are transferred to the round bottom flask, using a syringe. The suspension is cooled down to 0° C. and slowly shaken in an ice bath while adding 10 mL Bib (80.9 mmol) drop wise during 10 min. After addition of Bib, the round bottom flask is still shaken in the ice bath for further 10 min. Then, the reaction mixture is positioned on an orbital shaker, where it is gently shaken at room temperature overnight. The suspension turns brown during the first 30 min. Afterwards, the particles with immobilized ATRP initiator are washed exhaustively with THF and water, alternately, until the supernatant of washing solvent stays colorless. The obtained particles are stored in the refrigerator, in THF.

Example 3

SI AGET ATRP

A typical surface activation of CPG via SI AGET ATRP proceeds as follows. First, the catalyst system is prepared in a stock solution. For this purpose, 46.8 mg CuBr$_2$ (0.21 mmol) and 164.2 mg Bpy (1.05 mmol) are dissolved in 50 mL DMF, and sonicated for 5 min. Afterwards, 5 mL of CPG with immobilized initiator are measured and washed two times with DMF in a 20 mL column with frit. The CPG (5 mL), 1 mL of initiator solution (4.2 μmol CuBr$_2$), 7.5 mL DMF, and 0.53 mL GMA (4.0 mmol) are transferred to a 20 mL reaction vial with septum, and the mixture is purged with nitrogen for 5 min. The actual initiation of the polymerization ensues by adding 1 mL DMF, including 50 mg ascorbic acid (0.28 mmol), with a syringe. The reaction mixture turns from turquoise to brown during the first 5 min. The reaction vial is spun for 22 h at 30° C. in a hybridizer. After polymerization, the particles are washed and reslurried five times in DMF, minimum, to remove free polymer, and three times in water before they are either used for PrA coupling or stored in 20% ethanol.
Protein Coupling

Example 4

Using Poly(Acrylic Acid) Coated Resin

CPG particles (5 mL), modified by poly(acrylic acid) grafting, are measured in a 20 mL column with frit, and washed three times with 0.1 M aqueous $NaHCO_3$. Then, the particles are transferred to a 20 mL reaction vial, flowed by the addition of 10 mL of a protein A solution (15 mg/mL) in 0.1M $NaHCO_3$, containing 0.1 g EDC (0.52 mmol). Protein A coupling takes place in a hybridizer at 37° C. for 2.5 h. Subsequently, the particles are washed three times with 0.1M $NaHCO_3$ to remove unattached protein A. Obtained modified CPG is spun overnight at room temperature in 3% ethanol amine solution in 0.1M $NaHCO_3$. Next day, the sample is washed three times with water.

Example 5

Using Poly(Glycidyl Methacrylate) Coated Resin 5 mL of CPG, modified by poly(glycidyl methacrylate) grafting, are measured in a 20 mL column with frit, and conditioned three times with 0.1M aqueous $NaHCO_3$. The particles are then transferred to a 20 mL reaction vial, and 10 mL of a protein A solution (15 mg/mL) in 0.1 M $NaHCO_3$ are added. Protein A coupling takes place in a hybridizer at 37° C. for 2.5 h. Subsequently, the particles are washed three times with 0.1 M $NaHCO_3$ to remove unattached protein A. Residual epoxy groups are quenched by the treatment with 10 mL of a 10% thiol glycerol solution in 0.2M $NaHCO_3$, containing 0.5M NaCl overnight at room temperature. The particles are further washed alternately in 0.2M TRIS, containing 0.15M NaCl, and 0.05M acetic acid, and finally with 0.1M $NaHCO_3$.

Chromatographic Performance
Dynamic Binding Capacity (DBC)

The performance of packed columns in affinity chromatography is commonly determined by using the dynamic binding capacity (DBC) for characterization. The DBC provides the amount of IgG that can be attached in the column with constant feed flow until a defined percentage of feed IgG concentration is reached in the outlet, typically 10%. It is usually normalized to the column volume $V_C$ and can be expressed by the following equation.

$$DBC_{10\%} = \frac{c_F \cdot \dot{V} \cdot t_{b,10\%}}{V_C} = \frac{c_F \cdot V_{b,10\%}}{V_C}$$

$c_F$=IgG feed concentration
$\dot{V}$=volumetric flow rate
$t_{b,10\%}$=breakthrough time
$V_{b,10\%}$=breakthrough load volume
$V_C$=column volume The DBC is basically dependent on the equilibrium binding capacity, also referred to as the static binding capacity $Q_S$, but influenced by dispersive factors like mobile phase dispersion effects and mass transfer resistance of the solute. Thus, the static binding capacity reflects the thermodynamics of the system and can be used to characterize stationary phase regarding the theoretical maximal ability of IgG attachment. In sum, numerous of resin attributes are responsible for performance of a protein chromatographic column.

For high scale applications of polymer grafted porous ceramics in protein A chromatography, nevertheless, the DBC is an important index. For the new generated stationary phase, DBC is determined as follows.

FIG. 26 shows the schematically flow scheme for the assembly of equipment in DBC measurement.

DBC measurement is conducted with an Äkta chromatography system, the flow scheme is schematically depicted in FIG. 26. For current purpose, a chromatography column is packed with the respective resin, whereas the exact column volume needs to be known. For the measurement, the packed column is installed in the chromatography system. In a preparatory step the entire system is flushed with a loading buffer to ensure that the chemical environment equals the conditions of the IgG feed. Subsequently, the input is switched to the IgG feed, whereas the column is skipped at the beginning, and only the bypass is used. This set-up allows the internal determination of IgG concentration of the feed via UV detection, and furthermore, the tubing volume of loading buffer in front of the column is minimized. Once, the signal for IgG concentration is monitored by UV detector, the feed heads through the column for the actual DBC measurement. An exemplarily resulting chromatogram is shown in FIG. 27.

FIG. 27 shows a typical chromatogram for the DBC measurement of commercial available ProSepHC. The first signal which is caused by the bypass-switching determines the UV absorption for 100% IgG break through. Once, the valve switches from bypass position to column load position, it needs about one column volume until the UV signal reaches a value that reflects a certain amount of "non-binding IgG", the 0%-point for DBC determination. Subsequently, the column is loaded with IgG what is reflected by a negligible slope of the UV signal while IgG enters the column with the feed stream. From the break through point, when all easy accessible protein A spots are occupied, the amount of detected IgG increases very fast. Knowing the feed volume that passed through the column until a certain percentage of IgG break through and with the IgG feed concentration, the $DBC_{X\%}$ is calculable with the corresponding equation above.

Ligand Density $LD_{BCA}$(BCA Assay)

Bicinchoninic acid (BCA) assay for the determination of protein concentration has been introduced by P. K. Smith et al. in 1985. Assumed that all the protein is immobilized and that the resin volume is known, it can be used for the measurement of ligand density of protein A chromatography media. The principle of the BCA assay is based on the formation of Cu(I) complexes from Cu(II) in the presence of protein by the biuret reaction using bicinchoninic acid (see the following scheme). This deep purple complex shows a light absorptive maximum at 562 nm so that the concentration can be quantified using a UV spectrometer. Since there is a protein-to-protein variation in the sensitivity, a standard curve with the respective protein is required for every measurement. The ligand density is specified in mg protein A per mL of resin.

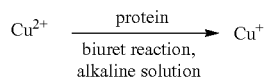

Cu$^+$ + BCA ⟶

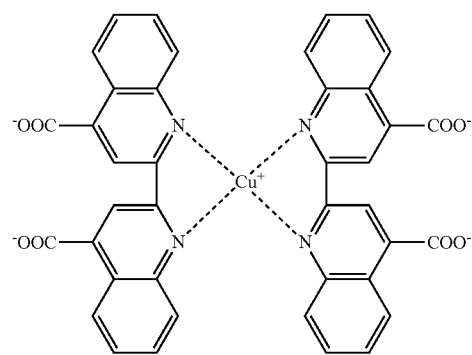

Complexation of Cu(I) and Bicinchoninic Acid in BCA Assay

Example 6

In the current work, ligand density measurement is conducted as follows. 1 mL of resin is scaled exactly in a 5 mL column with frit by tapping it, avoiding air bubbles. The wet filter cake is diluted with 9 mL water, and the dispersion is homogenized with a stir bar for the transfer of three times 125 µL in each one 5 mL test tube. Then, 375 µL of water are added. For the standard curve, test tubes are filled with a protein A standard solution (1 mg/mL), according the following table:

| Protein A solution [µl] | | | | | | | | |
|---|---|---|---|---|---|---|---|---|
| 0 | 10 | 25 | 50 | 75 | 100 | 150 | 200 | 250 |
| Water [µl] | | | | | | | | |
| 500 | 490 | 475 | 450 | 425 | 400 | 350 | 300 | 250 |

To every tube are added 4 mL of BCA assay solution (1:50; Pierce® BCA Protein Assay, Reagent A:Reagent B), and the capped tubes rotate for 4 h at room temperature. After particles are settled down, the absorption at 562 nm of each supernatant is determined with water as a blank, whereas the amount of protein A is figured out with the aid of the standard curve. For better accuracy, the average of three measurements is used for the results.

Static Binding Capacity $Q_S$

While the amount of protein A per volume of modified media is determined by the BCA assay, measurement of static binding capacity provides the amount of IgG that the media is able to capture. It is not mandatory that static binding capacity is linear increased with ligand density. The molecule orientation and the steric accessibility are important factors so that the knowledge of both values gives an idea of topology and nature of the pore structure after surface modification. While low $Q_S$ at high $LD_{BCA}$ hints to a lack of PrA accessibility, the opposite is an indicator for non-specific bindings.

The principle of $Q_S$ measurement is as follows. A buffered IgG solution (feed) is added to a defined volume of modified resin. When the exhaustion of available PrA on surface is reached, the IgG concentration of the feed subtracted the IgG concentration of the supernatant is the amount of captured IgG per volume of stationary phase, the static binding capacity $Q_S$. IgG concentration is determined by UV absorption at 280 nm, usually after 4 h.

$$Q_S = \frac{V_{feed} \cdot c_{IgG,feed} - V_{total} \cdot c_{IgG,supernatant}}{V_{resin}}$$

For the measurement in the current work, 1 mL of resin is scaled exactly, and diluted with water 1:10 (see $LD_{BCA}$ measurement). The dispersion is homogenized with a stir bar for the transfer of three times 1 mL in 16 mL test tubes. Every tube is filled up with IgG feed solution (1 mg/mL in PBS buffer with 5 mM EDTA), additionally one blank test tube for the determination of exact IgG feed concentration. The tubes are capped and rotate for 4 h at room temperature. After particles are settled down, the extinction at 280 nm $E_{280nm}$ of each supernatant is determined with PBS buffer, containing 5 mM EDTA as a blank. Absolute concentration of IgG $c_{IgG}$ in the supernatant is calculated via the Beer-Lambert law as follows:

$$E_{280nm} = \varepsilon_{280nm} \cdot c_{IgG} \cdot d$$

Converted for the determination of IgG concentration:

$$c_{IgG} = \frac{E_{280nm}}{\varepsilon_{280nm} \cdot d}$$

$\varepsilon_{280nm}$=extinction coefficient for IgG at wavelength of 280 nm d=width of used cuvette For better accuracy of the results, the average of three measurements is used.

Every measurement for $Q_S$, as well as for $LD_{BCA}$, is validated by the determination of $Q_S$ and $LD_{BCA}$, of Pro Sep vA High Capacity (ProSepHC) as one of the samples. ProSepHC is the commercial available protein A resin based on the same support material, used in this study, but modified with small molecule immobilization technique. The accuracy of both characterization methods is additionally proved by repeat of several measurements and by the determination of $Q_S$ and $LD_{BCA}$ of blank CPG.

Chemical Properties

Epoxy Titration

Epoxy titration is conducted based on a literature protocol.[81] Right after SI AGET ATRP, 1 mL of the DMF washed particles is measured exactly, and washed with 5 mL 1,4-dioxane. The pGMA grafted CPG is transferred to a 20 mL reaction vial, and 10 mL of ~0.2M HCl in 1,4-dioxane are added. The mixture is shaken intensively for 5 h and then, the residual acid is titrated with 0.05M NaOH in Ethanol, using phenolphthalein as indicator. The same procedure is conducted with blank CPG, so that the difference of needed NaOH means the amount of epoxy groups per mL of pGMA grafted CPG.

Elemental Analysis

Carbon Content (Galbraith Labs, Inc., Knoxville, Tenn.):

The LECO Carbon/Sulfur Determinator is designed to measure the carbon and sulfur in a wide variety of organic and inorganic materials by combustion and non-dispersive infrared detection. The sample is combusted at 1450±50° C.

in an atmosphere of pure oxygen using Thermolite as a combustion aid.
Analyte: Carbon Range: 1.7-0.05%
Bromine Content (Galbraith Labs, Inc., Knoxville, Tenn.):

Samples are weighed into a combustion cup and mineral oil is added as a combustion aid. For Bromine (Br) determinations, 1% hydrogen peroxide solution is added into the bomb. The sample and cup are sealed into a Parr oxygen combustion bomb along with a suitable absorbing solution. The bomb is purged with oxygen, then pressurized to 25-30 atm of oxygen pressure, and ignited. The contents of the bomb are well mixed and transferred to a beaker for subsequent ion chromatography.
Analyte: Bromine Range: ppm-%
Ce(IV)-Initiated Grafting from Porous Beads for the Synthesis of Protein A Affinity Medium:

Example 7

Ce(IV)-Initiated Grafting From CPG: Comparison of Uncoated and Trimethylolpropane Triglycidyl Ether (TMTGE)-Coated CPG (Surface Activation Step).

The Ce(IV) (CAN)-initiated grafting of poly(acrylic acid) (pAA) is attempted on both uncoated and TMTGE-coated CPG.

CPG is first treated with nitric acid for both "coated" and "uncoated" samples. Following the nitric acid wash, while "uncoated" CPG is directly grafted with pAA, "coated" CPG is first coated with TMTGE, and the residual epoxy groups are quenched with thioglycerol to provide diol groups suitable for Ce(IV)-initiation.

Following FIGS. 28 and 29 show the effect of TMTGE coating on static binding capacity (Qs) and ligand density ($LD_{BCA}$) of the final resin as a function of acrylic acid and Ce(IV) concentration, respectively.

As shown in FIGS. 28a), 28b), 29a) and 29b, there is clear advantage of coating CPG with TMTGE to improve the grafting efficiency, and consequently, Qs and $LD_{BCA}$. It should also be noted that even though $Q_S$ and $LD_{BCA}$ values of resin synthesized using uncoated CPG are lower compared to the coated CPG, these values are still significant higher than $Q_S$ and $LD_{BCA}$ observed on bare CPG.

This observation suggests that Ce(IV)-mediated polymerization is successful, albeit inefficiently, even with untreated CPG.

Example 8

Ce(IV)-Grafting from TiO2/ZrO2 Coated CPG for Synthesis of PrA Affinity Resin.

$ZrO_2$ coated CPG is treated in similar fashion as CPG. First the $ZrO_2$ coated CPG is coated with TMTGE, and the residual epoxy groups are quenched with thioglycerol to render diol groups suitable for initiation by Ce(IV). Then the Ce(IV)-initiated polymer grafting is performed with acrylic acid, and PrA is coupled to the pAA graft in the fashion similar to that of CPG to form PrA affinity medium.

FIG. 30 shows the effect of acrylic acid concentration on the Qs and $LD_{BCA}$ of PrA affinity media synthesized from $ZrO_2$-coated CPG by Ce(IV)-grafting method.

Ligand density is observed to increase with acrylic acid concentration until it reaches a plateau level at 15 mg/mL. The plot of Qs shows a maximum in Qs of 51.3 mg/mL at 0.17M AA. From this point, Qs rapidly decreases as [AA] increases. The maximum Qs and $LD_{BCA}$ obtained with ZrO2 coated CPG are comparable to that of CPG. This plot proves that the process of TMTGE coating followed by pAA grafting and PrA immobilization can be successfully transferred to appropriate $ZrO_2$ based porous system for the possible synthesis of caustic stable PrA affinity medium.

The following FIG. 31 shows the trace for dynamic binding capacity (DBC) measurement for the ZrO2 coated CPG based PrA medium. Based on this measurement, the DBC of the said material was found to be 29.1 mg/ml at 10% breakthrough and 3 min residence time.

Example 9

Ce(IV)-Grafting from Polymeric Porous (Eshmuno®) Beads for the Synthesis of PrA Affinity Medium.

Polymeric porous beads were grafted with pAA, and the pAA grafts were coupled with protein A to form PrA affinity medium.

For the Eshmuno® beads, the surface does not need to be treated with TMTGE. The Ce(IV)-initiated grafting is performed directly from the beads without any pretreatment/activation step as described briefly below:
1) The Eshmuno® beads (5 ml) are mixed with the solution containing Ce(IV), 65% nitric acid, and acrylic acid of known concentrations, and mixed in the hybridizer at 40 C for 22 hours for grafting pAA to the beads.
2) The beads are washed with deionized water, sulfuric acid solution in water containing ascorbic acid, water, phosphate buffer, and finally with water.
3) For protein A coupling, the pAA-grafted beads are mixed with protein A solution in suitable buffer containing known amount of activating agent, N-(3-Dimethylaminopropyl)-N'-ethylcarbodiimide hydrochloride (EDC).
4) Finally, the beads are quenched with ethanolamine to remove any residual reactive groups.

FIG. 32 shows an Qs and $LD_{BCA}$ of a representative protein A affinity medium synthesized using Eshmuno® beads by using Ce(IV)-initiated grafting process. However, a $LD_{BCA}$ of as high as 9.6 mg/ml has been achieved with the polymeric porous particles.

Example 10

Static Ion-Exchange Capacity of the pAA-Grafted CPG Beads
1. pAA-grafted CPG beads are synthesized by conducting polymerization from TMTGE-coated CPG beads for 20 hours at [AA]=0.45 M and [Ce(IV)]=0.03 M, and at 40 C.
2. Loading buffer containing 50 mM sodium acetate and 40 mM sodium chloride buffer at pH=4.5 and conductivity of 6.5 mS/cm is prepared.
3. The beads are first washed 5 times with deionized water and loading buffer each. Solutions of IgG and lysozyme are prepared in the loading buffer at the concentration of 5 mg/ml.
4. For each measurement, 1 ml of pAA-grafted CPG beads is measured.
5. The measured beads are suspended in 40 ml of IgG and lysozyme solution, and rotated slowly for 16 hours at room temperature.
6. After 16 hours of incubation, the beads are allowed to settle, and the supernatant is used for the measurement.
7. The concentration of igG and lysozyme in the supernatant ($C_S$) and the starting solutions ($C_I$) are measured using UV spectroscopy at the wavelength of 280 nm.
8. The ion-exchange capacity of the beads is calculated using following equation.

$$SBC(mg/ml) = \frac{(C_S - C_I) \times 40}{\text{volume of beads}}$$

The static capacity of pAA-grafted beads is found to be 56±2 mg/ml and 45±2 mg/ml for IgG and lysozyme, respectively.

BRIEF DESCRIPTION OF FIGURES

FIG. 17 shows the dependencies of ligand density (a) and static binding capacity (b) on acrylic acid concentration on small pore sized CPG with different EDC concentration, and 15 mg protein A per 1 mL of resin.

Figure 1:
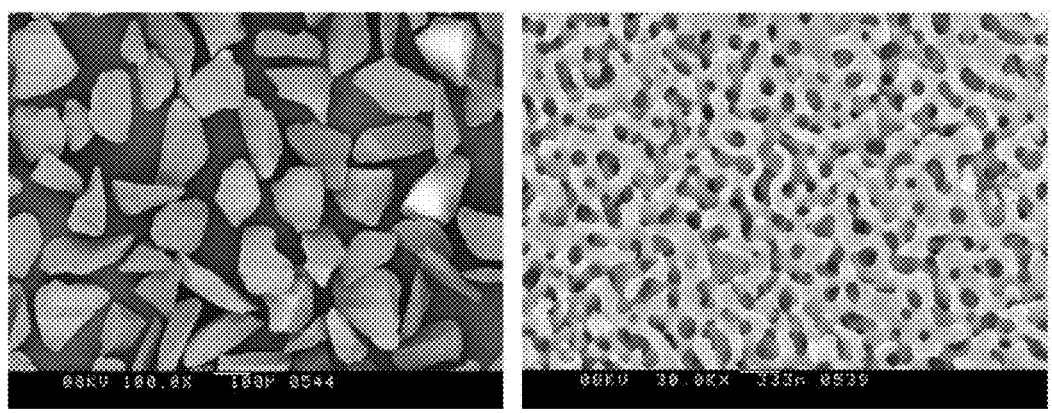
FIG. 1: Scanning electron micrograph of controlled pore glass (CPG) particles and pore structure
Figure 2:
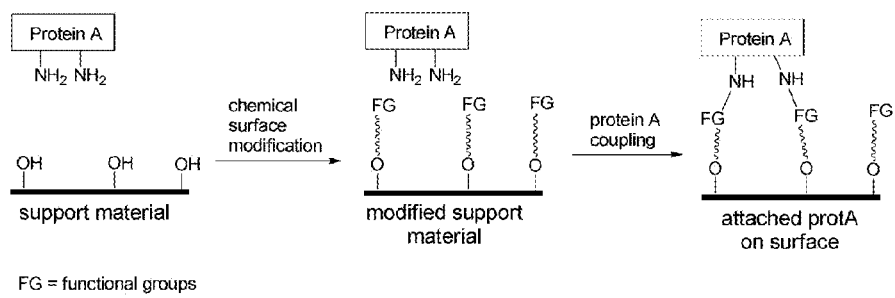
FIG. 2 shows schematically the immobilization reaction of protein A with hydroxyl groups on the surface of a suitable carrier FIGS. 3a) and b) shows the dependence of the $LD_{BCA}$ on reaction time and temperature at identical coupling conditions [$LD_{BCA}$ of protein A coupled CPG, coated with TMTGE, as a function of reaction time at 80° C. (a), and of reaction temperature for 4 h reaction time (b)].
Figure 3A:
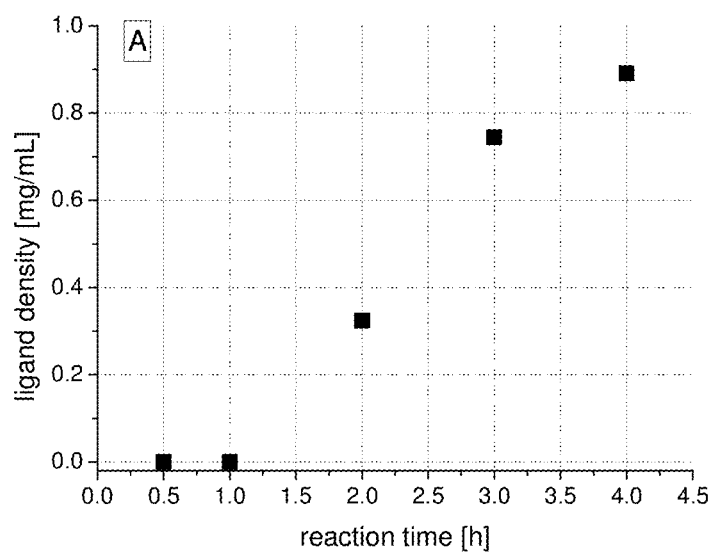
Figure 3B:
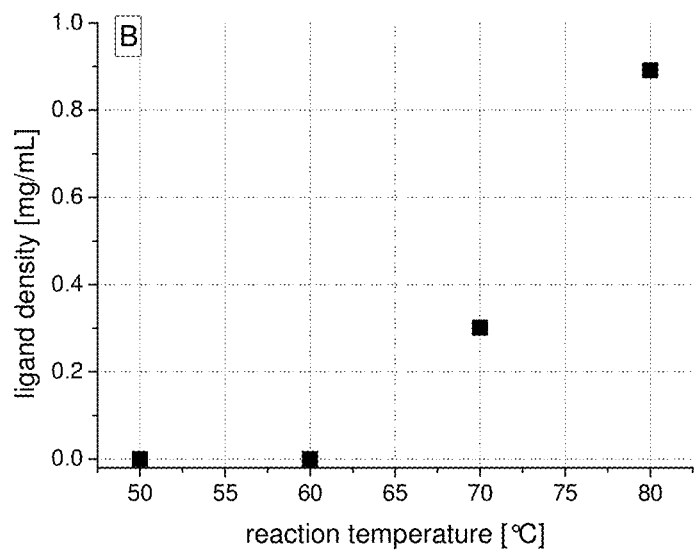
Figure 4A:
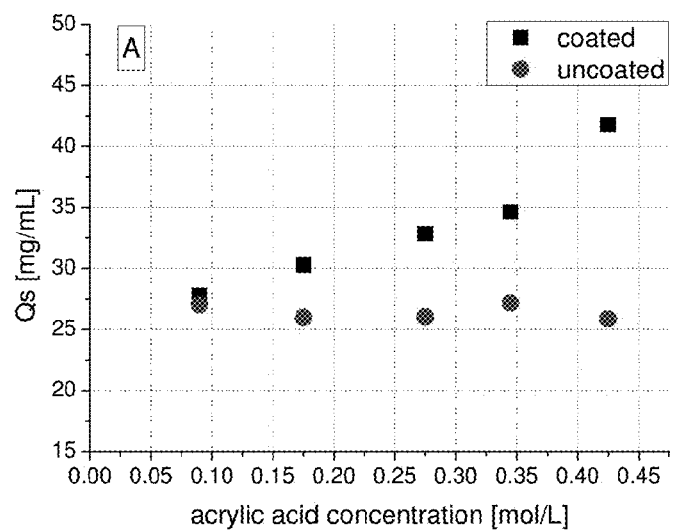
FIGS. 4a) and b) show the effect of TMTGE coating on static binding capacity and ligand density of the final resin at different concentrations of AA and CAN, respectively.
Figure 4B:
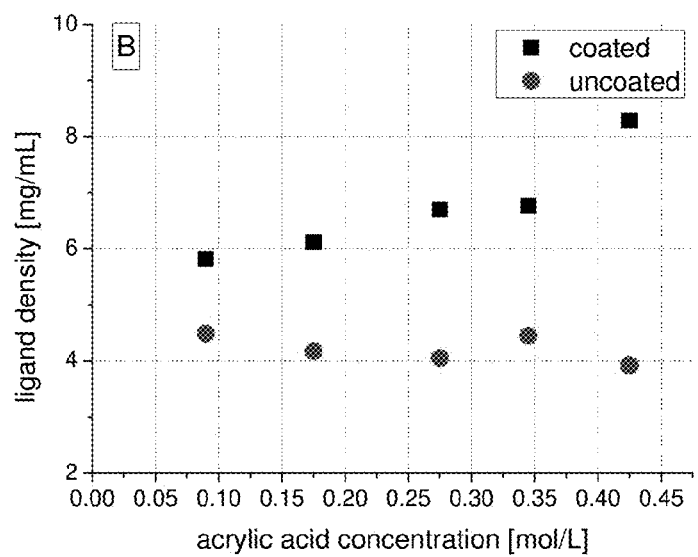
Figure 5A:
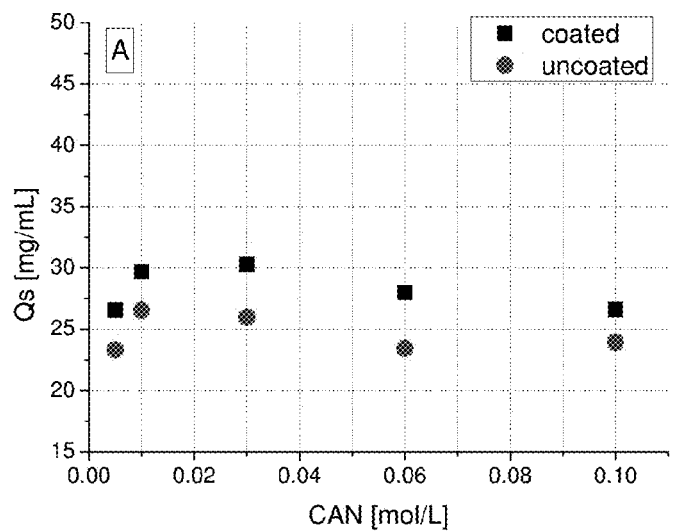
FIGS. 5a) and b) show the static binding capacity (a) and ligand density (b) of coated and uncoated samples with different initiator concentration at 40° C., 0.15M acrylic acid.
Figure 5B:
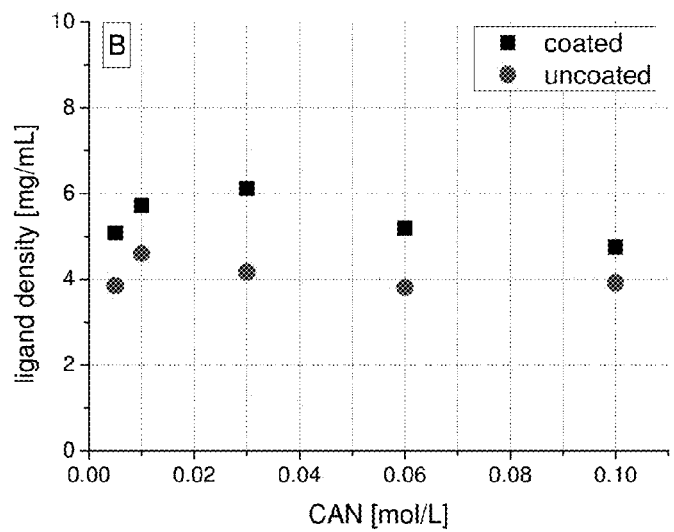
Figure 6:
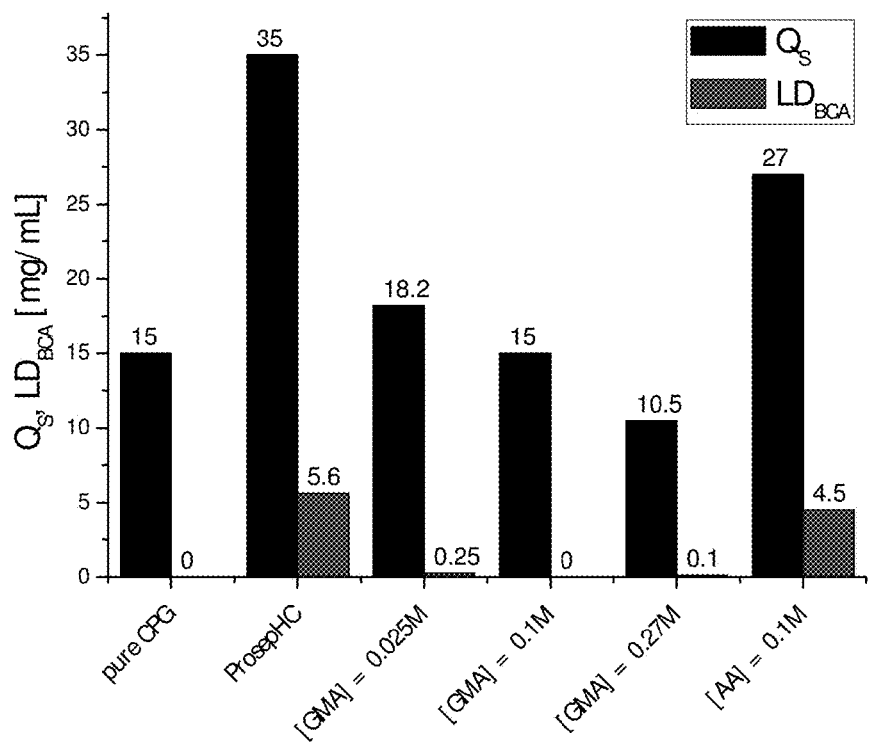
FIG. 6 shows polymerization results for $Q_S$ and $LD_{BCA}$ for pGMA grafted CPG with different monomer concentrations of 0.025M, 0.1M, and 0.27M; comparing with pure CPG and ProsepHC.
Figure 7:
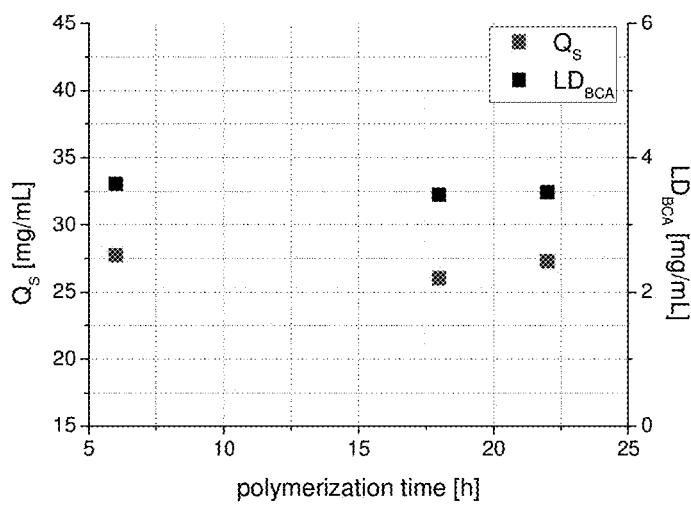
FIG. 7 shows received ligand density and static capacity for different polymerization durations in polymerization of acrylic acid on uncoated CPG
Figure 8:
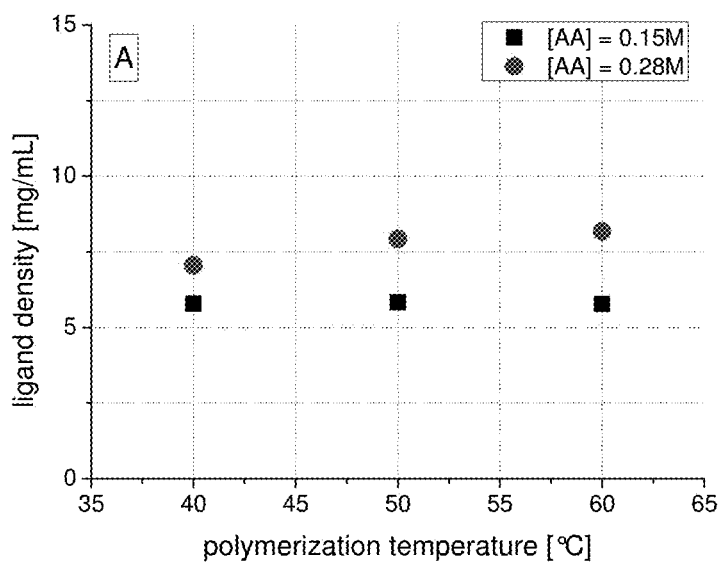
FIG. 8 shows received ligand density (a) and static capacity (b) dependent on polymerization temperature with two different acrylic acid concentrations.
Figure 8:
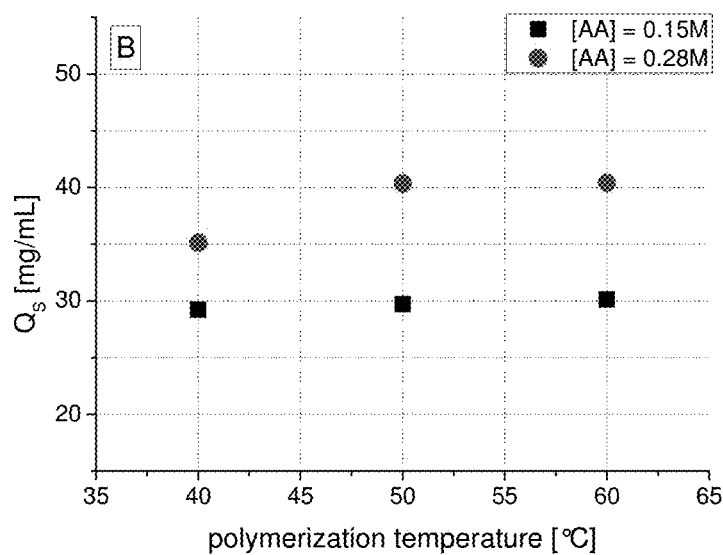
Figure 9:
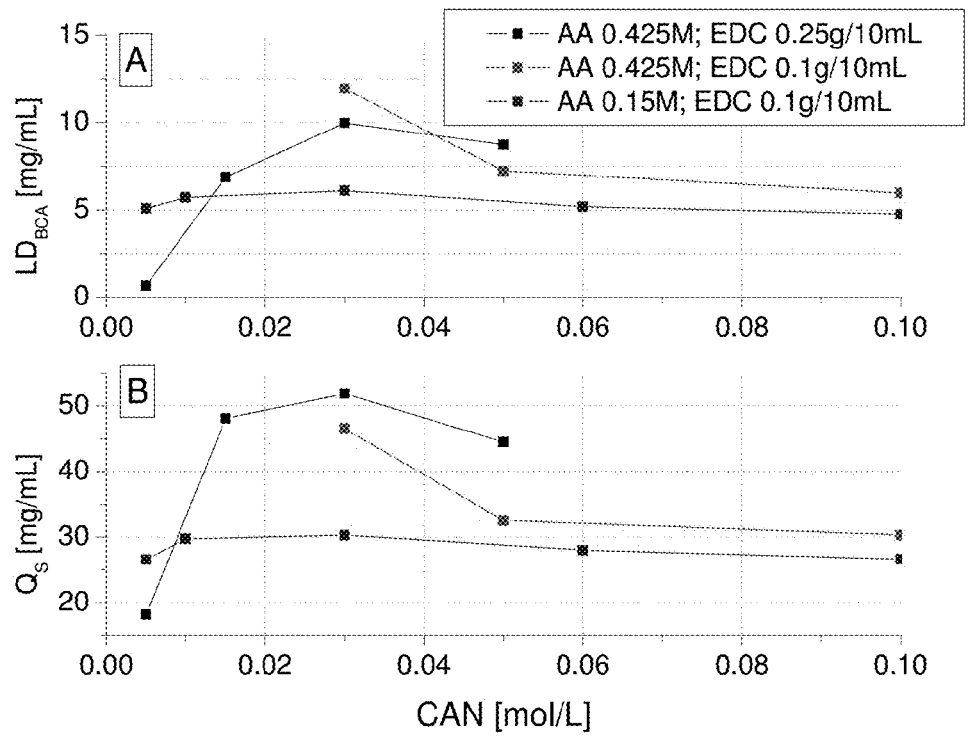
FIG. 9 shows ligand density and static capacity in dependency of CAN concentration, with varying acrylic acid and EDC concentrations.
Figure 10:
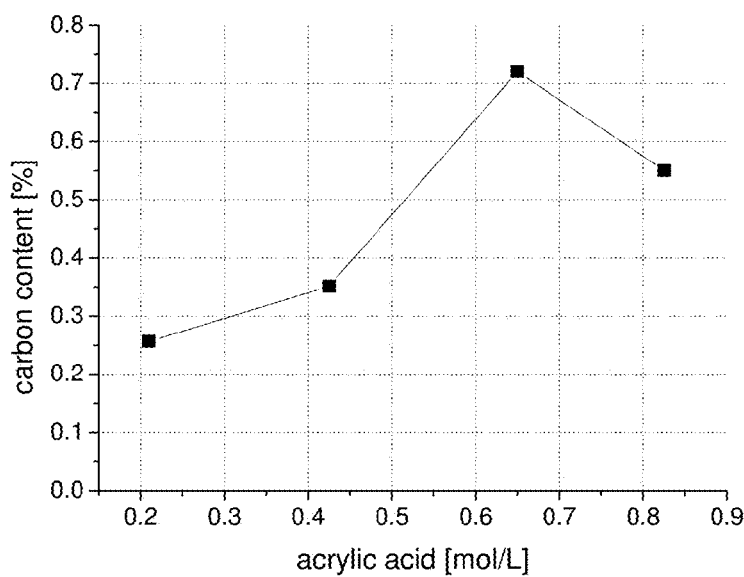
FIG. 10 shows the carbon content of grafted CPG for different acrylic acid concentrations
Figure 11:
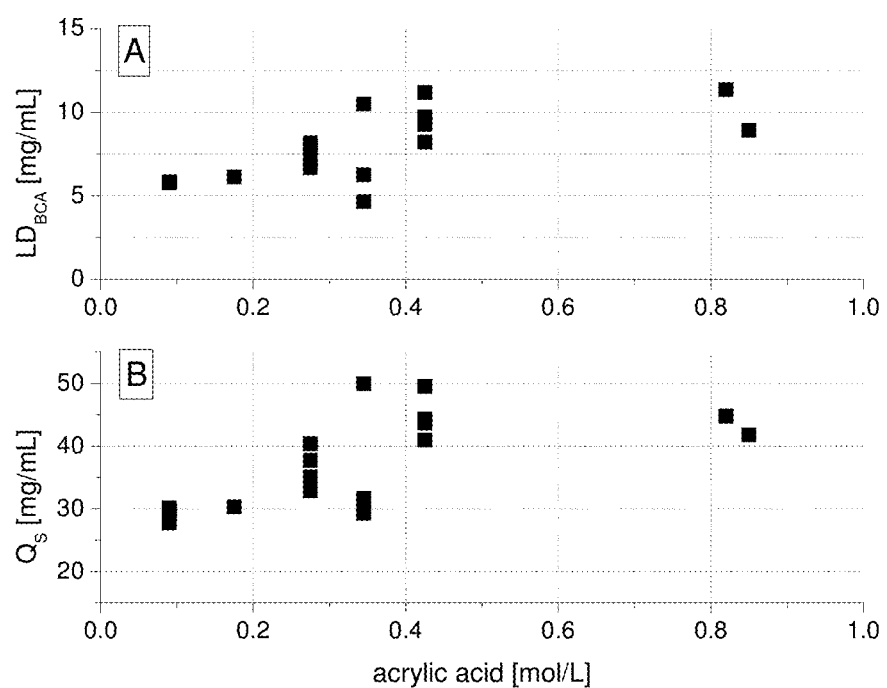
FIG. 11 shows ligand density (A) and static binding capacity (B) in dependency of acrylic acid concentration.
Figure 12A:
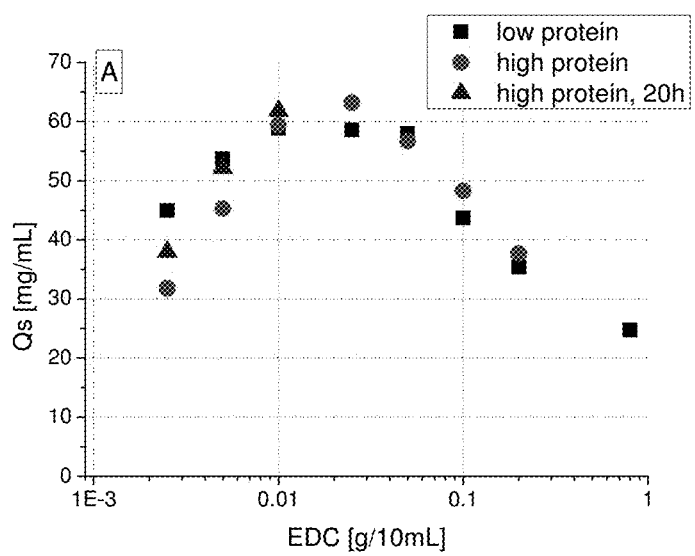
FIGS. 12a) and b) show static binding capacity (a) and ligand density (b) for attempts with varied EDC concentration and two different protein A amounts; 15 mg PrA/mL resin (low protein), 30 mg PrA/mL resin (high protein). Graft polymerization is conducted on TMTGE coated CPG with 0.425M acrylic acid, 0.03M CAN, at 40° C.
Figure 12:
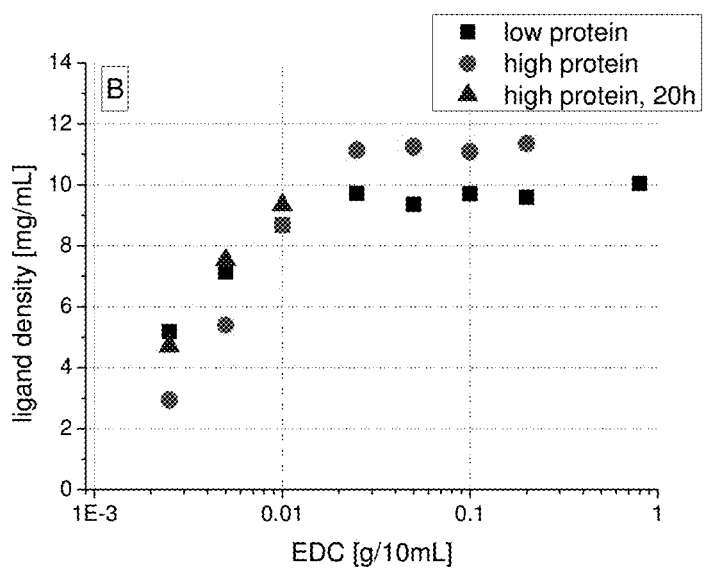
Figure 13:
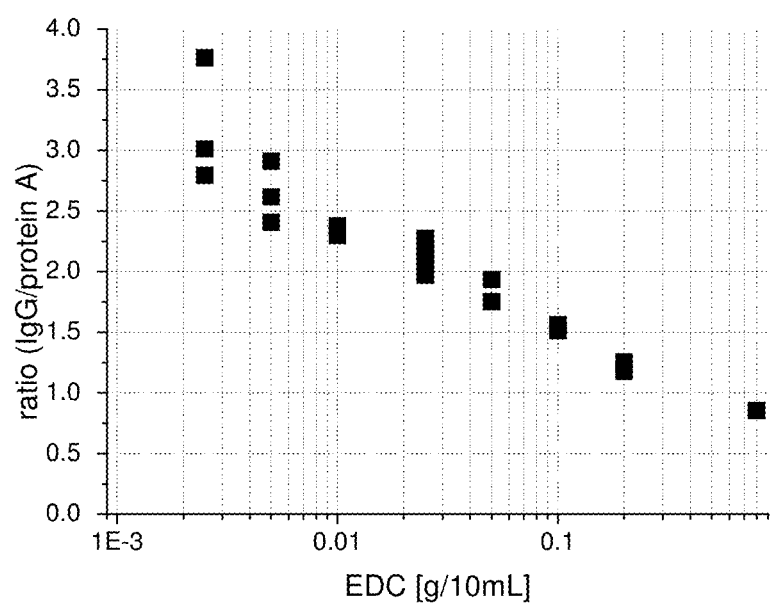
FIG. 13 shows the efficiency of immobilized protein A in regard to IgG capture ability dependent on EDC concentration. Calculations are based on molecular weights for protein A of 50 kD and for IgG of 144 kD.
Figure 14:
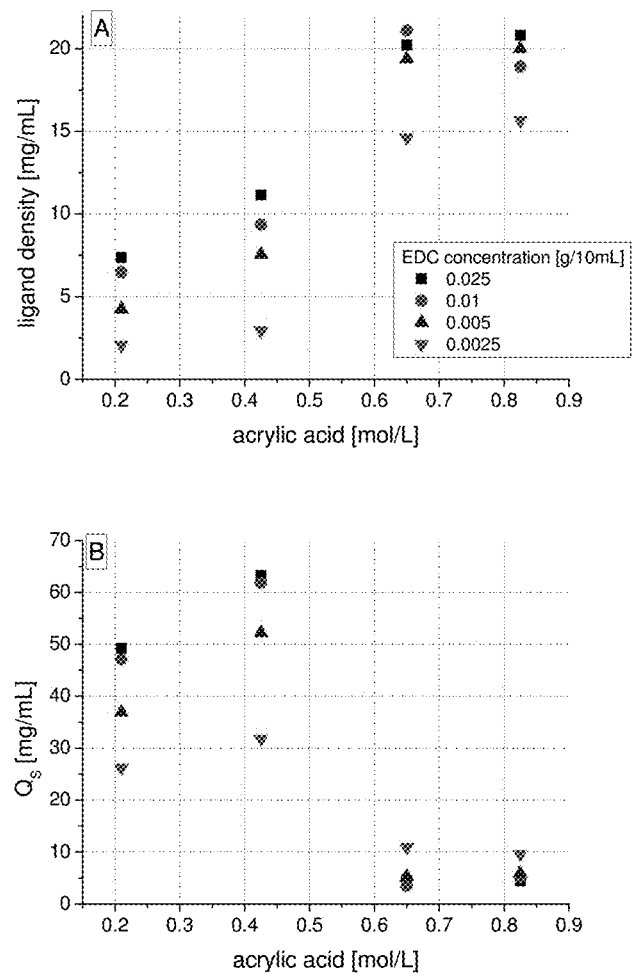
FIGS. 14a) and b) show dependencies of $LD_{BCA}$ (a) and $Q_S$ (b) on acrylic acid concentration and different EDC concentrations with high protein amount (30 mg protein A per 1 mL of resin)
Figure 15:
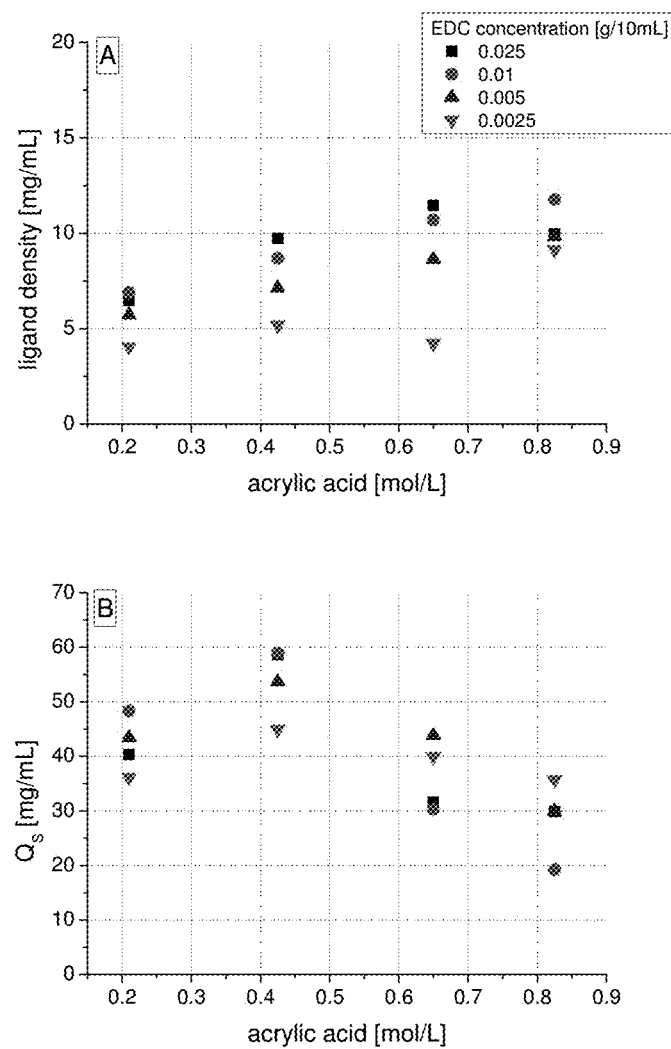
FIGS. 15a) and b) show dependencies of $LD_{BCA}$ (A) and $Q_S$ (B) on acrylic acid concentration and different EDC concentrations with low protein amount (15 mg protein A per 1 mL of resin)
Figure 16:
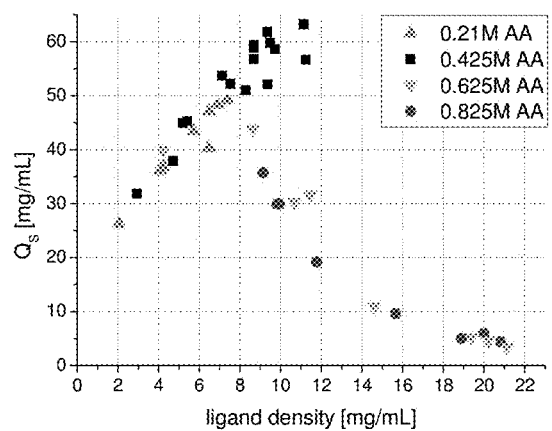
FIG. 16 shows the static binding capacity versus ligand density for the acrylic acid concentrations of 0.21M, 0.425M, 0.65M, and 0.85M.
Figure 18:
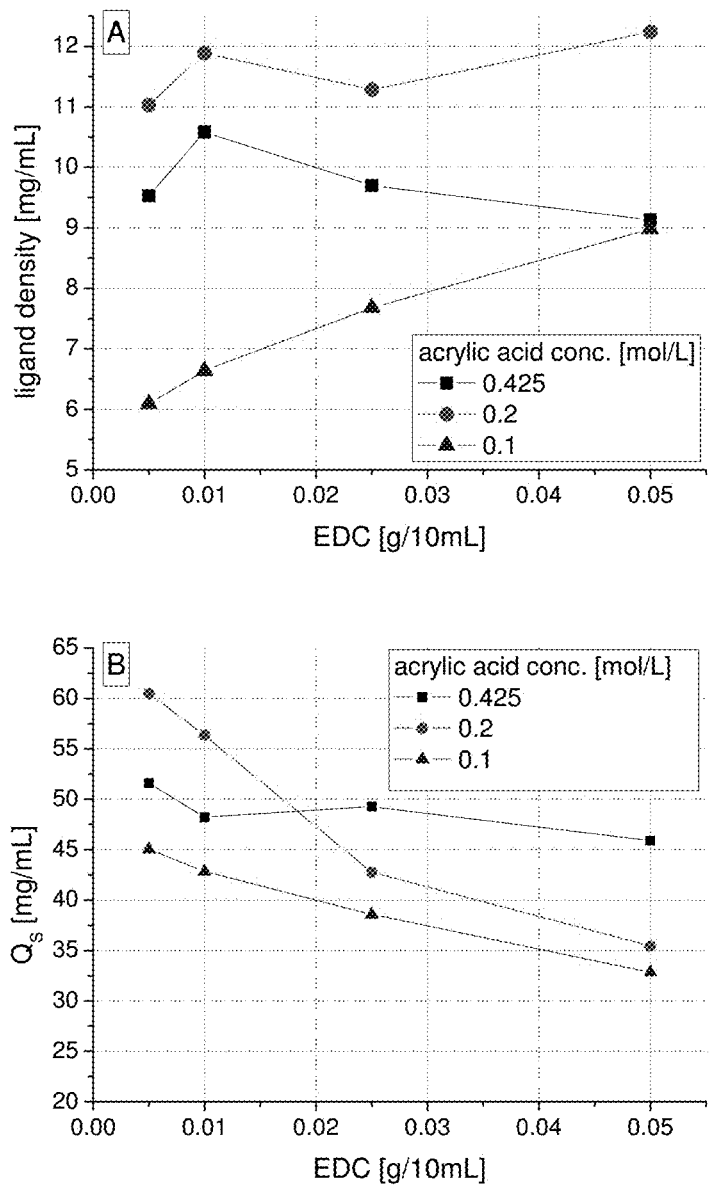
FIGS. 18a) and b) show ligand density (A) and static binding capacity (B) at varied EDC and acrylic acid concentration.
Figure 19:
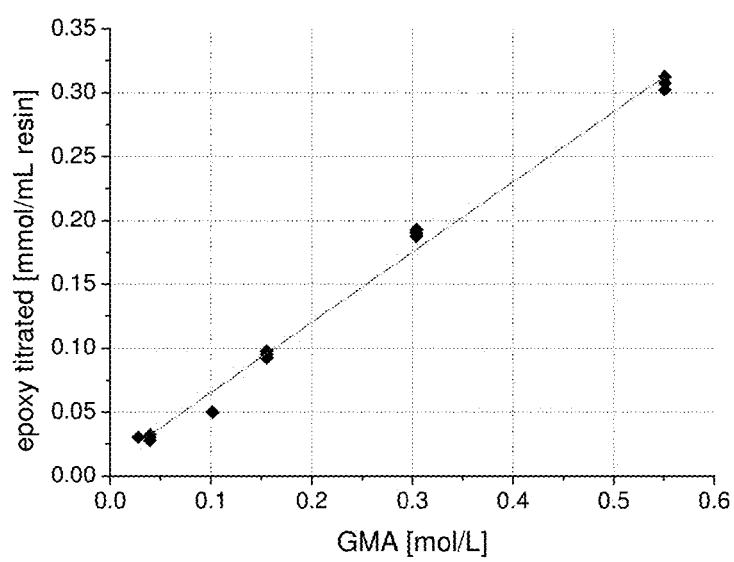
FIG. 19 shows the determined number of epoxy groups by titration on pGMA grafted CPG via SI AGET ATRP with varied GMA concentration as a linear function.
Figure 20:
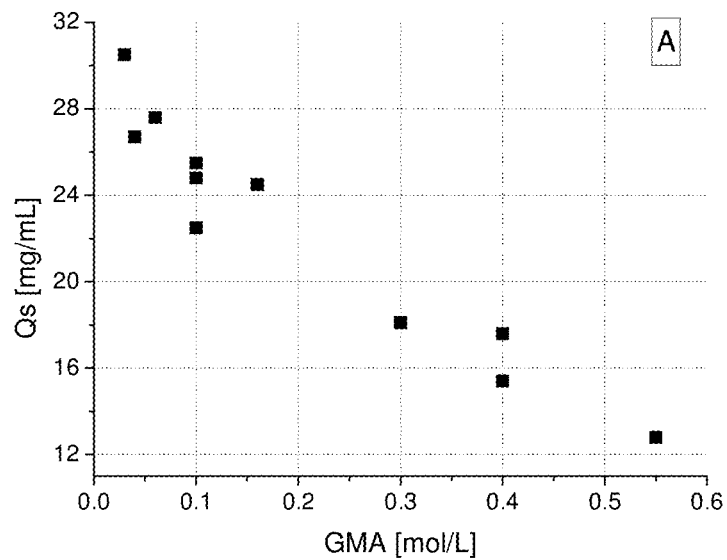
FIGS. 20a) and b) show the i Influence of GMA concentration on static binding capacity (a) and ligand density (b) on CPG, grafted via SI AGET ATRP FIG. 21 EDX measurement of pure CPG (A), and zirconia coated CPG (B).
Figure 20B:
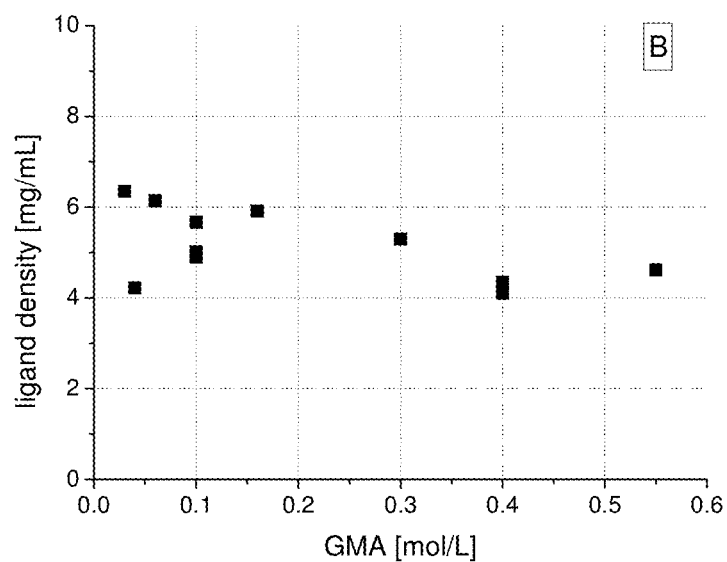
Figure 21:
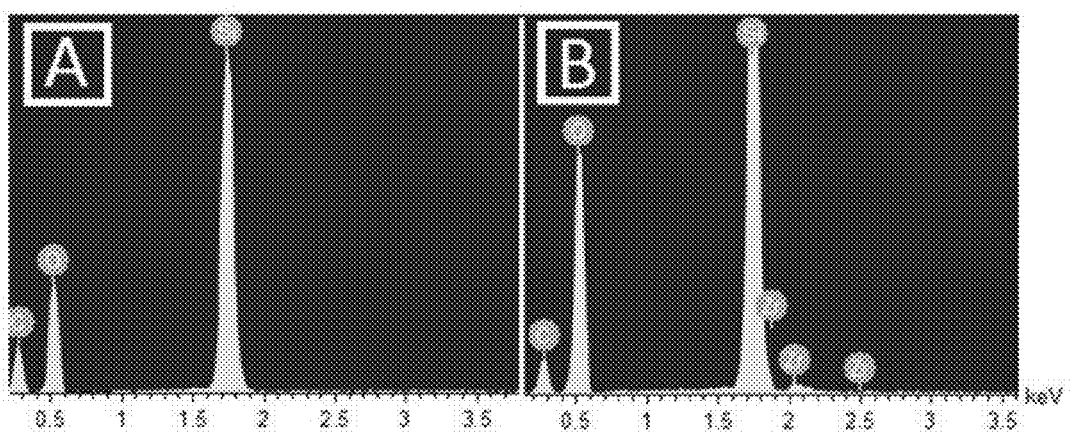
Figure 22A:
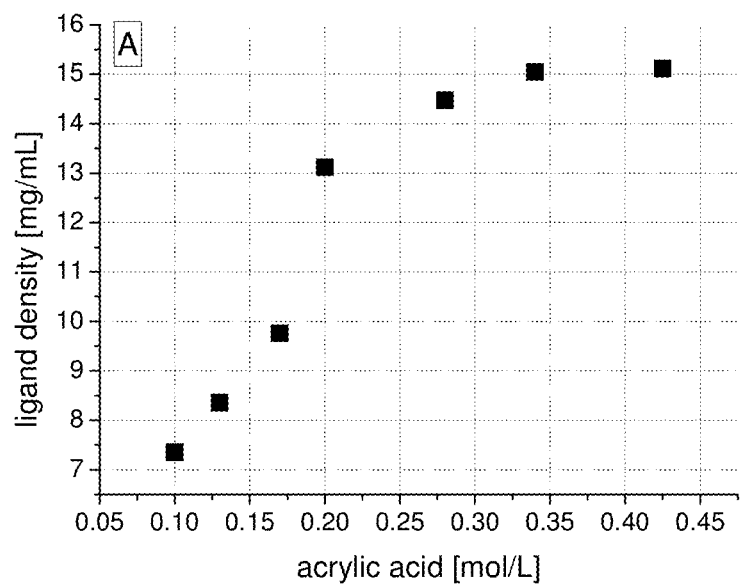
FIGS. 22a) and b) show the influence of acrylic acid concentration on ligand density (a) and static binding capacity (b) of zirconia coated CPG. EDC: 0.025 g/10 mL, protein A: 30 mg/mL resin.
Figure 22B:
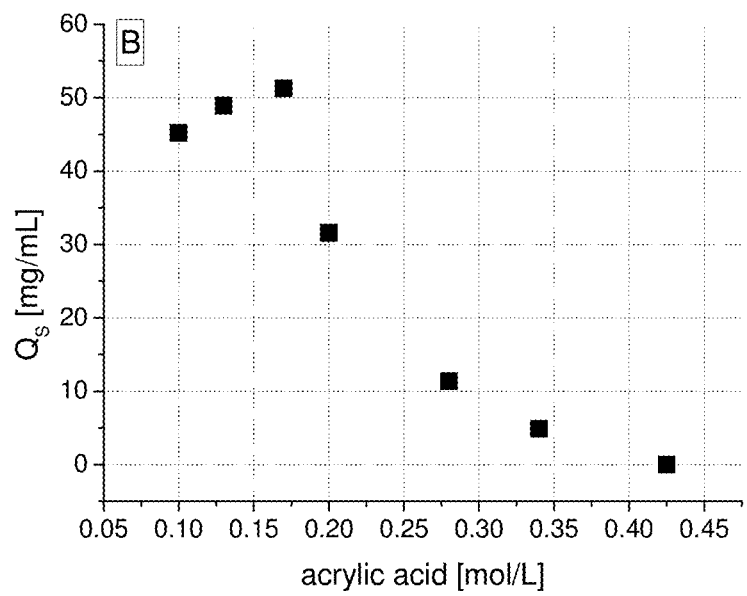
Figure 23:
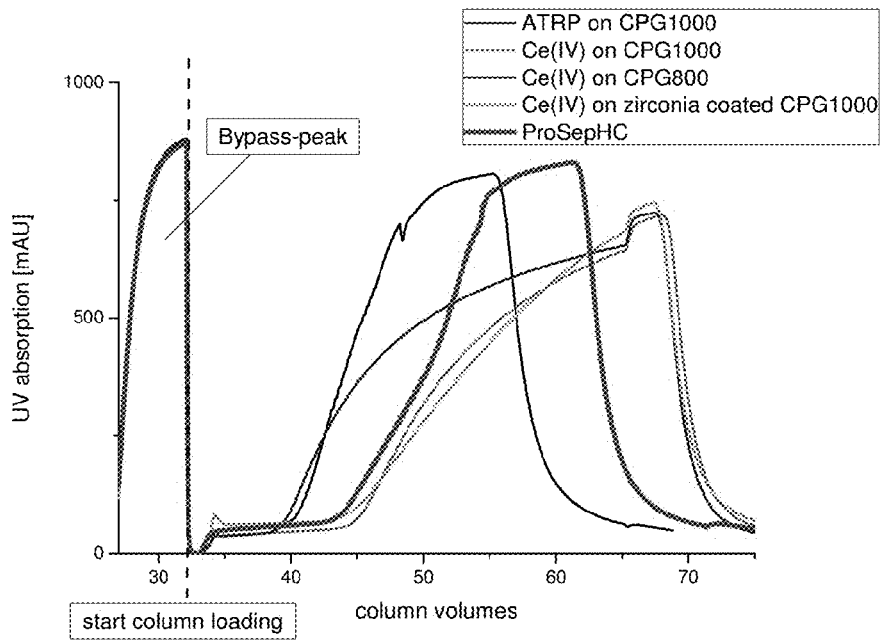
FIG. 23 shows the results for dynamic binding capacity measurement of different resins on zirconia coated CPG. IgG feed concentration is 2 mg/mL, residence time is 3 min.
Figure 24:
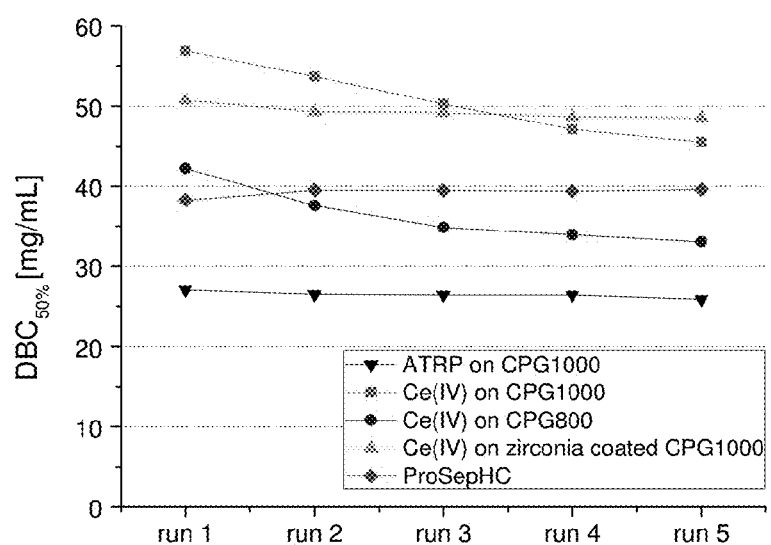
FIG. 24 shows Changes of DBC50% during five measurement runs.
Figure 25:
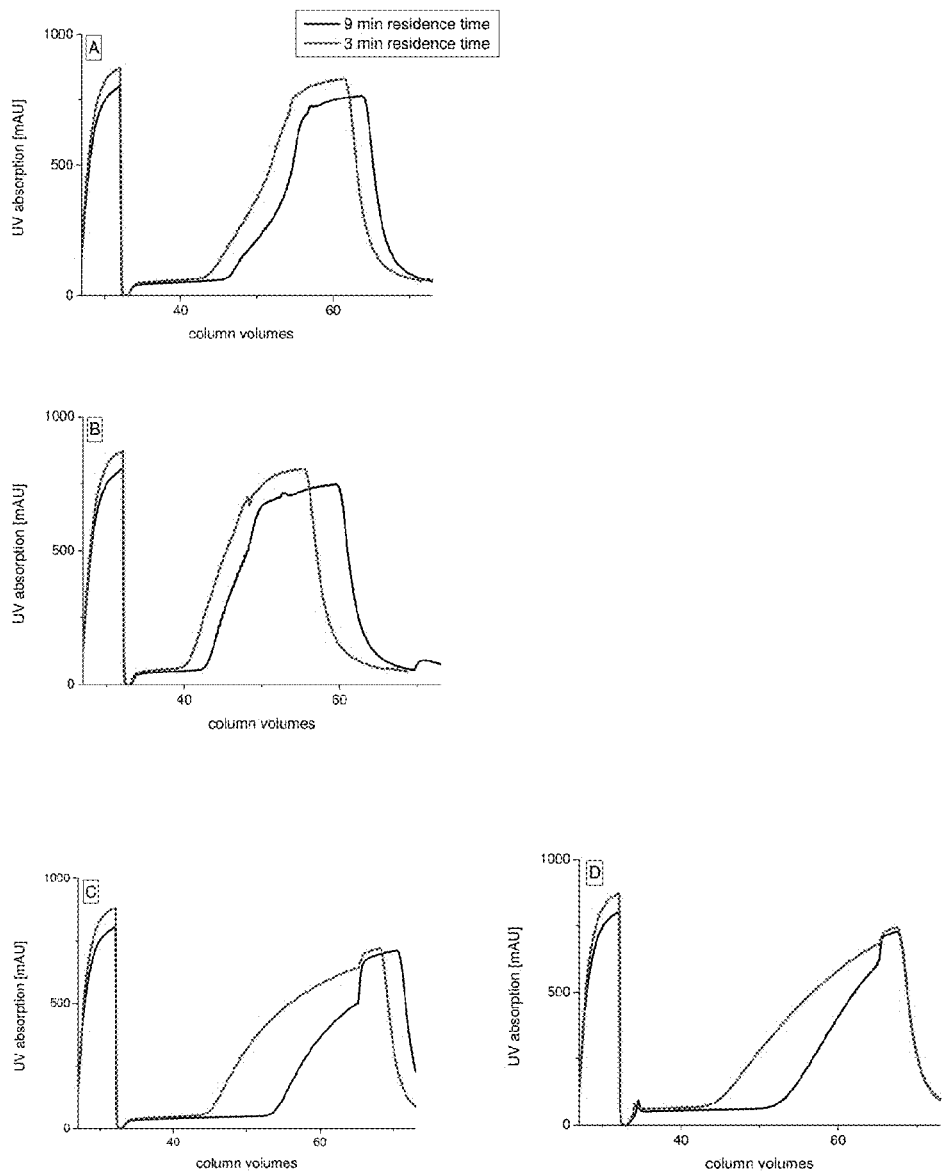
FIG. 25a)-d) show comparisons of column loading behavior with 3 min and 9 min residence time, for ProSepHC (a), ATRP treated CPG (b), CPG1000 with pAA tentacles (c), and $ZrO_2$ coated CPG with pAA tentacles (d).
Figure 26:
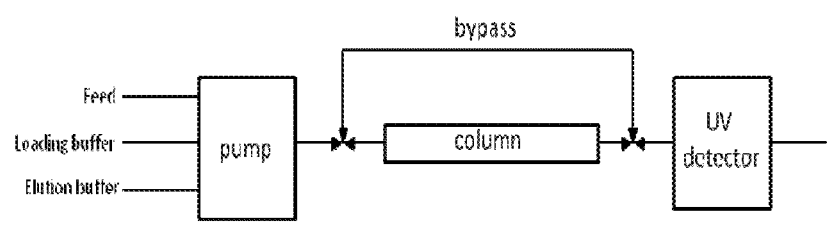
FIG. 26 shows the schematically flow scheme for the assembly of equipment in DBC measurement
Figure 27:
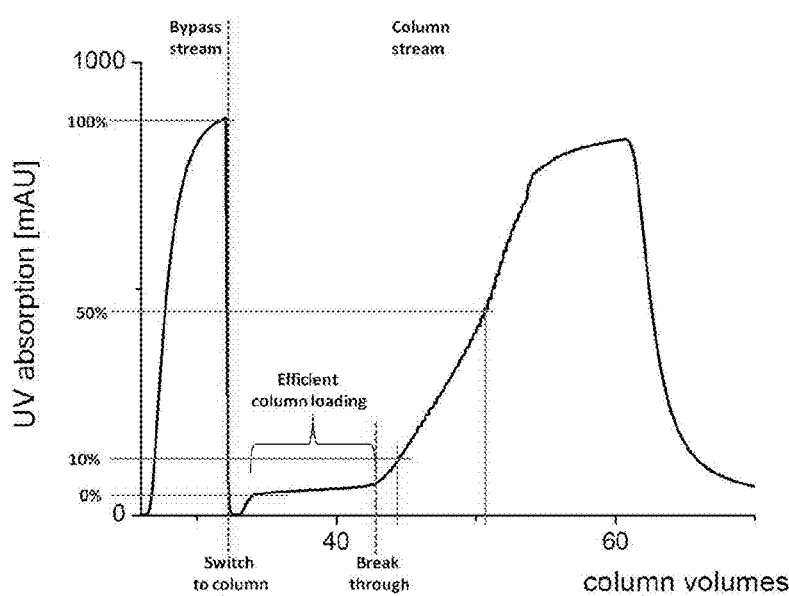
FIG. 27 shows a typical chromatogram for the DBC measurement of commercial available ProSepHC FIGS. 28a) and b) show static binding capacity (A) and ligand density (B) of coated and uncoated samples as a function of acrylic acid concentration at 40° C., and [Ce (IV)] of 0.03M.
Figure 28A:
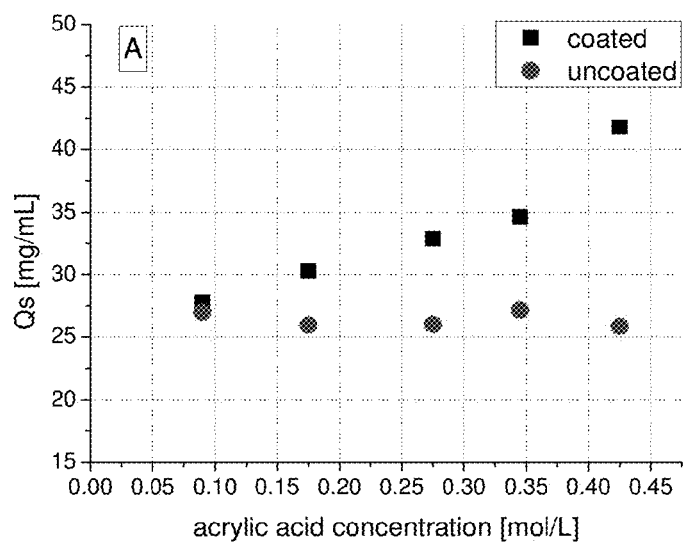
Figure 28B:
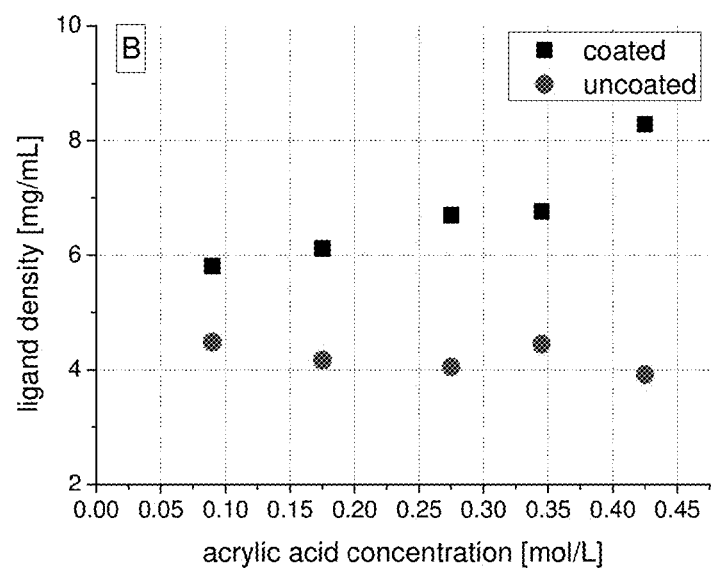
Figure 29A:
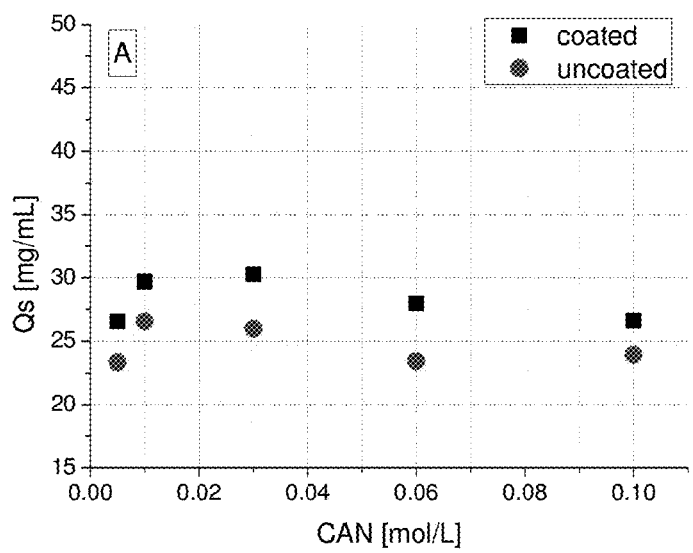
FIGS. 29a) and b) show static binding capacity (A) and ligand density (B) of coated and uncoated samples as a function of initiator concentration at 40° C., 0.15M acrylic acid.
Figure 29B:
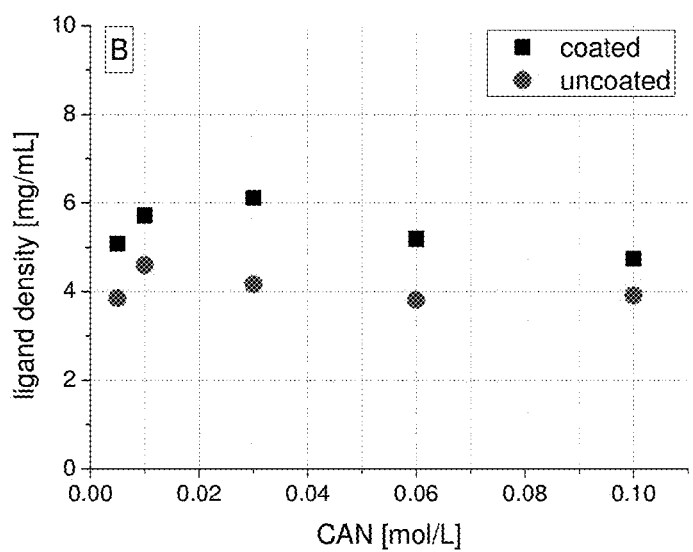
Figure 30A:
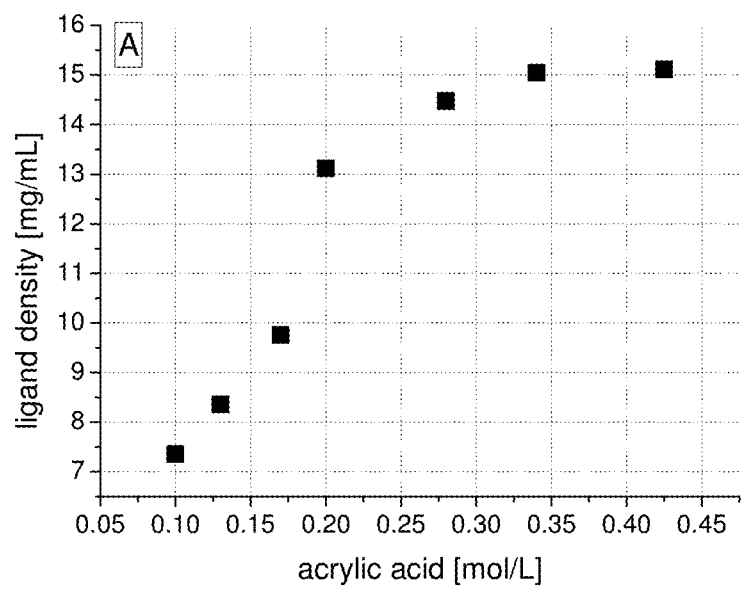
FIGS. 30a) and b) show the influence of acrylic acid concentration on ligand density (A) and static binding capacity (B) of $ZrO_2$ coated CPG. EDC: 0.025 g/10 mL, protein A: 30 mg/mL resin.
Figure 30B:
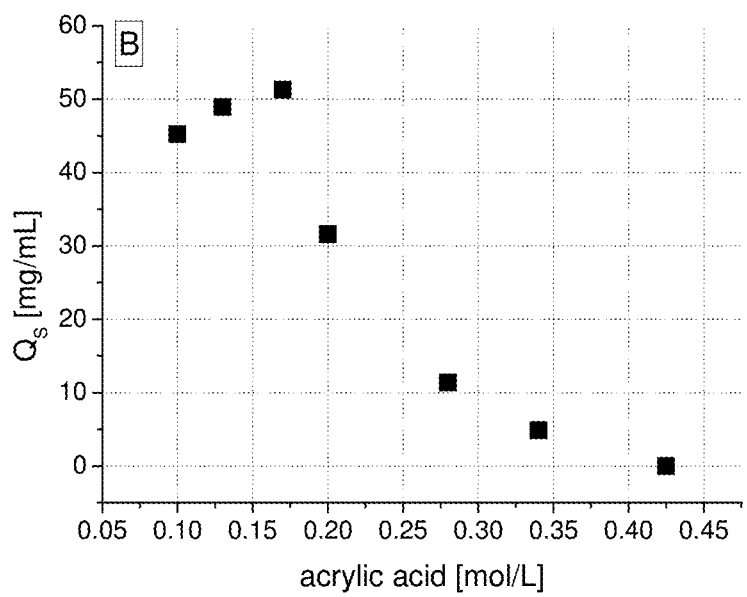
Figure 31:
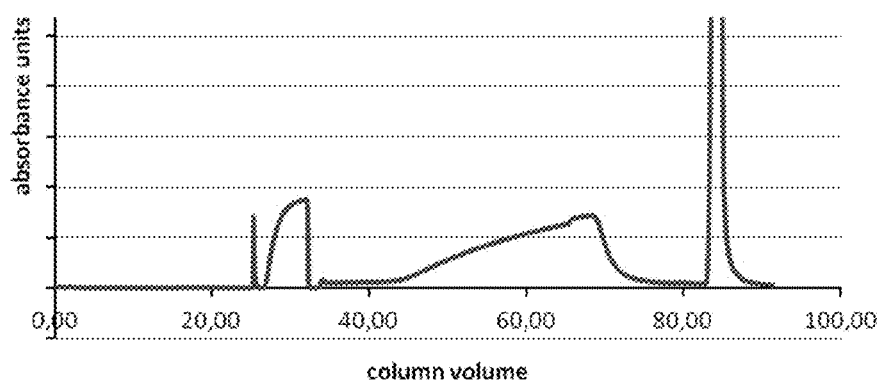
FIG. 31 shows the trace for dynamic binding capacity measurement of PrA affinity medium synthesized from $ZrO_2$ coated CPG.
Figure 32:
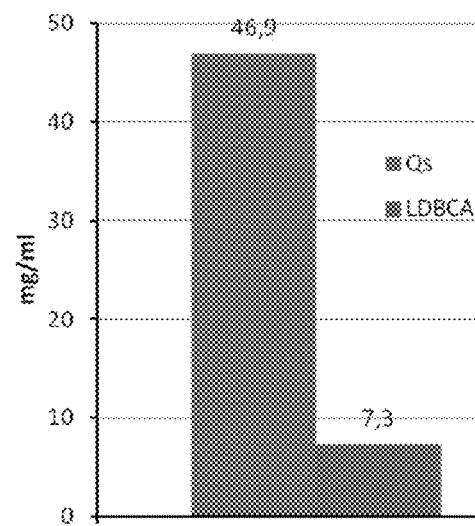
FIG. 32 shows an Qs and $LD_{BCA}$ of an example PrA affinity medium synthesized from polymeric porous beads

What is claimed:

1. A separating material for affinity chromatography based on a hydroxyl-containing porous base support, to a surface of which porous base support grafted are polymer chains by covalent bonding via OH groups present on the surface of the base support, comprising
    a) a porous base support, which base support has been produced from a medium containing silica, which base support has first been coated with zirconia or titanium oxide, and which base support has been treated with a tri- or more functional epoxide,
    b) two or more grafted polymer chains having been initiated from one hydroxyl group present on the surface of the base support, and
    c) each grafted polymer chain has multiple reactive groups which are suitable for coupling affinity ligands.

2. The separating material according to claim 1, wherein the porous base support is a porous ceramic medium.

3. The separating material according to claim 1, wherein the porous base support is a porous ceramic medium comprising oxides of silicium, zirconium titanium, or a mixture thereof.

4. The separating material according to claim 1, wherein on the porous base support as a result of the treatment with the tri- or more functional epoxide formed is a crosslinked coating having hydroxyl groups, thereby providing the OH groups on the surface of the base support.

5. The separating material according to claim 1, wherein the porous base support has been treated with a tri- or more functional epoxide forming a crosslinked coating containing epoxy functionality.

6. The separating material according to claim 1, comprising the porous base support, wherein the OH groups present on the base support are present in a crosslinked coating containing aliphatic hydroxyl or diol groups to which covalently bound are graft polymer chains comprising acrylic acid or its derivative providing carboxylic acid groups.

7. The separating material according to claim 1, comprising the porous base support, wherein the OH groups present on the base support are present in a crosslinked coating containing aliphatic hydroxyl or diol groups to which covalently bound are graft polymer chains by surface initiated polymerization of monomers of glycidyl methacrylate, vinyl azlactone, acrylic acid N-hydroxysuccinimide ester, or methacrylic acid N-hydroxysuccinimide ester, providing reactive groups for further functionalization.

8. The separating material according to claim 6, comprising the porous base support, wherein the OH groups present on the base support are present in a crosslinked coating containing aliphatic hydroxyl or diol groups to which covalently bound are graft polymer chains built from acrylic acid or its derivative and one or more monomers providing carboxylic acid groups, which one or more monomers are selected from the group consisting of maleic acid, acrylic acid, methacrylic acid, carboxyethylmethacrylamide, carboxyethylmethacrylamide, carboxylacrylamide, carboxymethacrylamide, carboxypropylacrylamide, carboxymethylacrylamide, 2-acrylamido-2-methylsulphonic acid, acrylamideethane sulphonic acid, 2-(diethylaminoethyl)acrylamide, 2-(diethylaminoethyl)methacrylamide, 2-(acryloylaminoethyl)-trimethylammonium chloride, 3-(acryloylaminopropyl)-trimethylammonium chloride, 2-(dimethylaminoethyl)methacryl-amide, 2-(dimethylaminoethyl)acrylamide, 2-(diethylaminopropyl)acrylamide, 2-(diethylaminopropyl)methacrylamide, 2-(methacryloylaminoethyl)-trimethylammonium chloride, and 3-(methacryloylaminopropyl)-trimethylammonium chloride and optionally hydrophobic monomers comprising linear or branched alkyl, aryl, alkylaryl, arylalkyl having up to 18 carbon atoms, which optionally contain alkoxy, cyano, carboxy, acetoxy or acetamino groups.

9. The separating material for ion-exchange chromatography according to claim 6, comprising the porous base support, wherein the OH groups present on the base support are present in a crosslinked coating containing aliphatic hydroxyl or diol groups to which covalently bound are graft polymer chains, which have been made from one or more monomers selected from the group consisting of maleic acid, acrylic acid, methacrylic acid, carboxyethylmethacrylamide, carboxyethylmethacrylamide, carboxylacrylamide, carboxymethacrylamide, carboxypropylacrylamide, carboxymethylacrylamide, 2-acrylamido-2-methylsulphonic acid, acrylamideethane sulphonic acid,
2-(diethylaminoethyl)acrylamide, 2-(diethylaminoethyl)methacrylamide, 2-(acryloylaminoethyl)-trimethylammonium chloride, 3-(acryloylaminopropyl)-trimethylammonium chloride, 2-(dimethylaminoethyl)methacryl-amide, 2-(dimethylaminoethyl)acrylamide, 2-(diethylaminopropyl)acrylamide, 2-(diethylaminopropyl)methacrylamide, 2-(methacryloylaminoethyl)-trimethylammonium chloride, and 3-(methacryloylaminopropyl)-trimethylammonium chloride,
and optionally
hydrophobic monomers comprising linear or branched alkyl, aryl, alkylaryl, arylalkyl having up to 18 carbon atoms, which optionally contain alkoxy, cyano, carboxy, acetoxy or acetamino groups.

10. The separating material according to claim 1, wherein each polymer chain has multiple reactive groups suitable for coupling protein A.

11. The separating material according to claim 1, wherein each polymer chain has multiple reactive groups to at least some of which is coupled protein A.

12. A process for preparing a separating material for affinity chromatography based on a hydroxyl-containing porous base support, to a surface of which porous base support grafted are polymer chains by covalent bonding via OH groups present on the surface of the base support, comprising a) a porous base support, which base support has been produced from a medium containing silica, which base support has first been coated with zirconia or titanium oxide, and which base support has been is treated with a tri- or more functional epoxide, b) two or more grafted polymer chains having been initiated from one hydroxyl group present on the surface of the base support, and c) each grafted polymer chain has multiple reactive groups which are suitable for coupling affinity ligands, and wherein each polymer chain has multiple reactive groups to at least some of which is coupled protein A, said process comprising a) coating the porous silica base support medium with zirconium oxide or titanium oxide and, optionally after treatment with mineral acid, sodium hydroxide or plasma, b) reacting with a tri-functional epoxide, c) graft polymerizing with chains comprising acrylic acid or its derivative providing carboxylic acid groups onto the coating of step b), which contains aliphatic hydroxyl or diol groups, and d) coupling protein A to a reactive group of the grafted polymer chain.

13. A method for the removal of a biopolymer from a liquid medium, comprising removing said biopolymer from said liquid medium by a separating material according to for affinity chromatography based on a hydroxyl-containing porous base support, to a surface of which porous base support grafted are polymer chains by covalent bonding via OH groups present on the surface of the base support, comprising a) a porous base support, which base support has been produced from a medium containing silica, which base support has first been coated with zirconia or titanium oxide, and which base support has been treated with a tri- or more functional epoxide, b) two or more grafted polymer chains having been initiated from one hydroxyl group present on the surface of the base support, and c) each grafted polymer chain has multiple reactive groups which are suitable for coupling affinity ligands.

14. The method according to claim 13, wherein the biopolymer, which has been adsorbed to the separating material by interaction with coupled protein A and/or ionic groups of grafted polymer chains and optionally with hydrophobic groups is desorbed by a) increasing the ion strength and/or
b) modifying the pH in the solution and/or c) an eluent having a different polarity to that of the adsorption buffer.

15. A chromatography column, containing a separating material for affinity chromatography based on a hydroxyl-containing porous base support, to a surface of which porous base support grafted are polymer chains by covalent bonding via OH groups present on the surface of the base support, comprising a) a porous base support, which base support has been produced from a medium containing silica, which base support has first been coated with zirconia or titanium oxide, and which base support has been is treated with a tri- or more functional epoxide, b) two or more grafted polymer chains having been initiated from one hydroxyl group present on the surface of the base support, and c) each grafted polymer chain has multiple reactive groups which are suitable for coupling affinity ligands.

* * * * *